(12) United States Patent
Hosaka et al.

(10) Patent No.: US 10,574,438 B2
(45) Date of Patent: Feb. 25, 2020

(54) SECURITY APPARATUS, METHOD THEREOF, AND PROGRAM

(71) Applicant: NIPPON TELEGRAPH AND TELEPHONE CORPORATION, Chiyoda-ku (JP)

(72) Inventors: Miki Hosaka, Musashino (JP); Yasushi Takami, Musashino (JP); Tokutaro Yoshida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 262 days.

(21) Appl. No.: 15/112,637

(22) PCT Filed: Feb. 17, 2015

(86) PCT No.: PCT/JP2015/054234
§ 371 (c)(1),
(2) Date: Jul. 19, 2016

(87) PCT Pub. No.: WO2015/125765
PCT Pub. Date: Aug. 27, 2015

(65) Prior Publication Data
US 2016/0337119 A1    Nov. 17, 2016

(30) Foreign Application Priority Data
Feb. 18, 2014    (JP) .................................. 2014-028274

(51) Int. Cl.
*H04L 9/06*    (2006.01)
*H04L 9/32*    (2006.01)
*H04L 29/06*    (2006.01)

(52) U.S. Cl.
CPC .......... *H04L 9/0625* (2013.01); *H04L 9/0643* (2013.01); *H04L 9/32* (2013.01); *H04L 63/0428* (2013.01)

(58) Field of Classification Search
CPC combination set(s) only.
See application file for complete search history.

(56) References Cited

U.S. PATENT DOCUMENTS 5,530,757 A * 6/1996 Krawczyk ............. H04L 9/3236
713/161
5,553,139 A * 9/1996 Ross ....................... G06F 21/10
340/5.74

(Continued)

FOREIGN PATENT DOCUMENTS

JP    2004-336702 A    11/2004

OTHER PUBLICATIONS

Japanese Office Action dated Dec. 20, 2016 in Patent Application No. 2016-504101 (with English translation).
(Continued)

*Primary Examiner* — Piotr Poltorak
(74) *Attorney, Agent, or Firm* — Oblon, McClelland, Maier & Neustadt, L.L.P.

(57) ABSTRACT

In sharing processing, a security apparatus applies secret sharing to processing information m to obtain a plurality of pieces of fragment information (where n=1, ..., N), obtains verification information which is an image of the obtained fragment information through mapping, stores the verification information and outputs the fragment information. Each piece of the fragment information is stored in a storage apparatus. In restoration processing, the security apparatus accepts input of fragment information (where k=1, ..., K) required for restoration, compares fourth verification information which is an image of the inputted fragment information through mapping with stored verification informa- (Continued)

tion, and restores the processing information m from the fragment information (where k=1, ..., K) corresponding to the fourth verification information which matches the verification information.

15 Claims, 14 Drawing Sheets

(56) References Cited

U.S. PATENT DOCUMENTS

| | | | | |
|---|---|---|---|---|
| 5,675,649 | A * | 10/1997 | Brennan | H04L 9/085 380/286 |
| 7,036,014 | B2 * | 4/2006 | Bellare | H04L 9/3249 713/176 |
| 7,974,415 | B2 * | 7/2011 | Nochta | H04L 9/0891 380/273 |
| 8,630,983 | B2 * | 1/2014 | Sengupta | G06F 17/30289 707/654 |
| 8,881,249 | B2 * | 11/2014 | Nunn | G06F 21/45 713/182 |
| 9,092,441 | B1 * | 7/2015 | Patiejunas | G06F 17/30221 |
| 9,158,927 | B1 * | 10/2015 | Franklin | G06F 21/602 |
| 9,203,616 | B1 * | 12/2015 | Brown | H04L 9/3273 |
| 9,639,473 | B1 * | 5/2017 | Adda | G06F 12/0875 |
| 9,680,809 | B2 * | 6/2017 | Seul | G06F 21/6218 |
| 9,785,498 | B2 * | 10/2017 | Misra | G06F 17/30209 |
| 9,898,474 | B1 * | 2/2018 | Sorenson, III | G06F 17/30091 |
| 2003/0084298 | A1 * | 5/2003 | Messerges | H04L 9/3236 713/176 |
| 2006/0235895 | A1 * | 10/2006 | Rodriguez | H04L 63/123 |
| 2007/0168670 | A1 * | 7/2007 | Dean | G06F 21/52 713/176 |
| 2007/0250674 | A1 * | 10/2007 | Fineberg | G06F 11/1451 711/162 |
| 2009/0006853 | A1 * | 1/2009 | Li | H04L 63/0428 713/176 |
| 2009/0106393 | A1 * | 4/2009 | Parr | H04L 63/0428 709/218 |
| 2010/0037056 | A1 * | 2/2010 | Follis | G06F 11/1464 713/171 |
| 2010/0042842 | A1 * | 2/2010 | Huang | H04L 9/3236 713/176 |
| 2010/0235588 | A1 * | 9/2010 | Maeda | H04L 9/085 711/147 |
| 2010/0332751 | A1 * | 12/2010 | Quigley | H04L 63/0428 711/114 |
| 2012/0102321 | A1 * | 4/2012 | Obana | G06F 21/00 713/164 |
| 2012/0159620 | A1 * | 6/2012 | Seifert | H04L 63/1416 726/22 |
| 2013/0036277 | A1 * | 2/2013 | Szczepkowski | G06F 3/0608 711/159 |
| 2013/0036289 | A1 * | 2/2013 | Welnicki | G06F 3/0608 711/173 |
| 2014/0007252 | A1 * | 1/2014 | Eisen | G06F 21/73 726/26 |
| 2014/0052706 | A1 * | 2/2014 | Misra | G06F 17/30194 707/698 |
| 2014/0201541 | A1 * | 7/2014 | Paul | G06F 21/6245 713/193 |
| 2014/0223196 | A1 * | 8/2014 | Ignomirello | G06F 3/0641 713/193 |
| 2015/0169253 | A1 * | 6/2015 | Donlan | G06F 3/0604 711/161 |
| 2015/0244522 | A1 * | 8/2015 | Cheruvath | H04L 9/0894 713/183 |
| 2016/0197939 | A1 * | 7/2016 | Wang | G06F 21/10 726/4 |
| 2016/0253515 | A1 * | 9/2016 | Damgard | H04L 9/085 713/165 |
| 2017/0063397 | A1 * | 3/2017 | Richardson | H03M 13/154 |
| 2017/0255589 | A1 * | 9/2017 | Barber | G06F 15/167 |
| 2017/0293535 | A1 * | 10/2017 | Niles | G06F 11/1464 |

OTHER PUBLICATIONS

Extended European Search Report dated Jul. 12, 2017 in Patent Application No. 15751506.5.
Chi Sing Chum, et al., "Hash Function Based Secret Sharing Scheme Designs" arXiv.org, Cornell University Library, arXiv:1111. 1278v1, X080537511, Nov. 5, 2011, pp. 1-16.
International Search Report dated Apr. 7, 2015, in PCT/JP2015/ 054234 Filed Feb. 17, 2015.
Yonamine, et al., "The wide area network storage system based on secret sharing threshold scheme", IEICE Technical Report, vol. 105, No. 290, Sep. 9, 2005 (10 Pages).
Shamir, "How to Share a Secret", Communications of the ACM, vol. 22, No. 11, Nov. 1979 (2 Pages).
Office Action dated Feb. 28, 2017 in Japanese Application No. 2016-504101 (with English language translation).
Combined Office Action and Search Report dated Jul. 12, 2018 in Chinese Patent Application No. 201580008388.2 (with English translation), 27 pages.

* cited by examiner

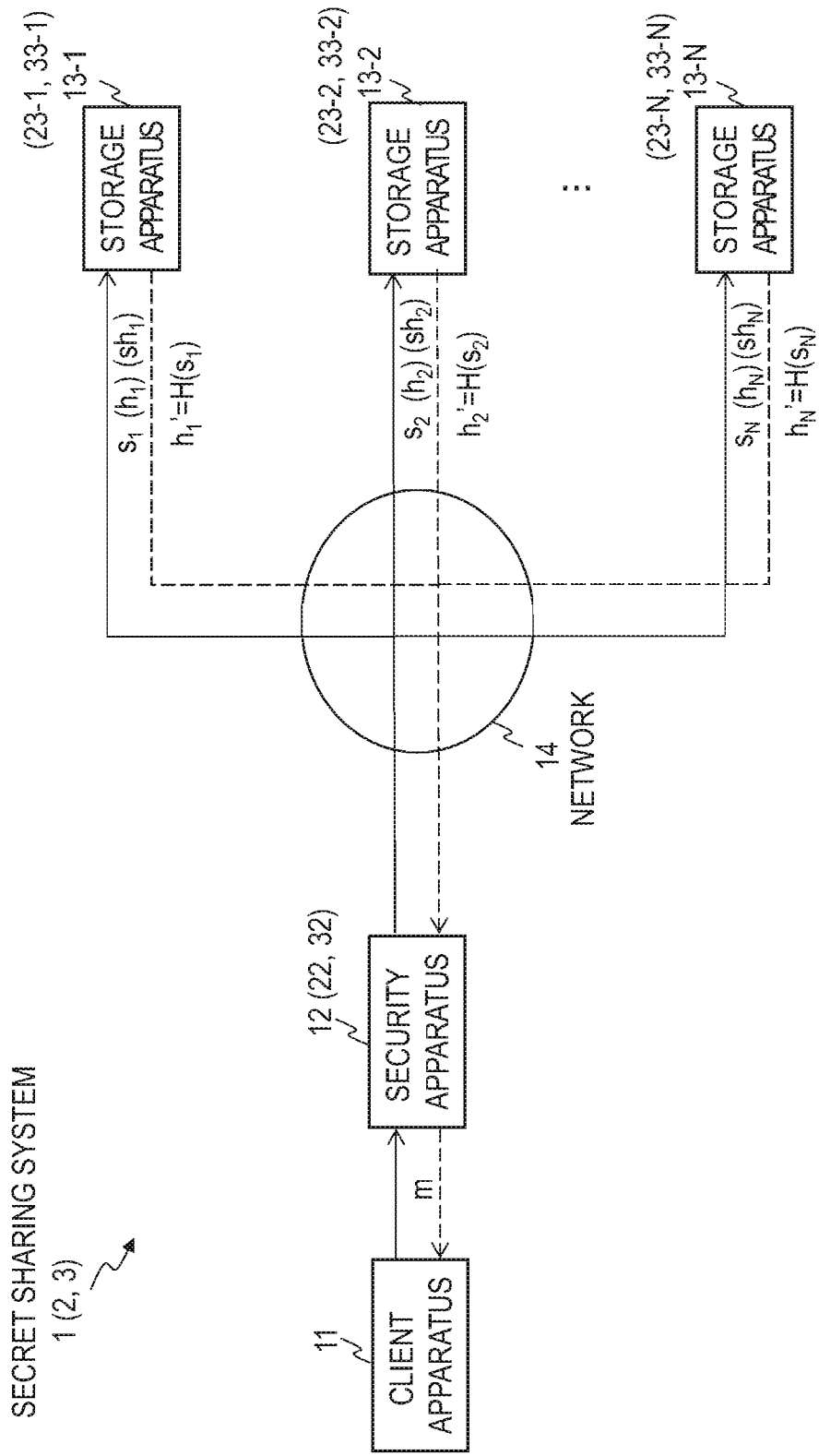

SECURITY APPARATUS, METHOD THEREOF, AND PROGRAM

TECHNICAL FIELD

The present invention relates to a secret sharing technique, and, more particularly, to guaranteeing of integrity of fragmented information.

BACKGROUND ART

A secret sharing technique is a technique of dividing information into a plurality of pieces of fragment information each of which is meaningless alone and sharing and storing the information to improve confidentiality and availability of the information (see, for example, Non-patent literature 1). To improve availability, the pieces of fragment information are transmitted to a plurality of data centers through communication which utilizes, for example, a secure channel on the Internet, and stored in storages on the data centers.

PRIOR ART LITERATURE

Non-Patent Literature

Non-patent literature 1: Adi Shamir, "How to share a secret", Communications of the ACM 22 (11), pp. 612-613, 1979.

SUMMARY OF THE INVENTION

Problems to be Solved by the Invention

However, although each piece of fragment information is meaningless alone, with the conventional technique, there is a possibility that it is impossible to detect tampering by a third party or corruption of a plurality of pieces of the fragment information.

The present invention has been made in view of such problems, and is directed to providing a technique which can detect tampering or corruption of the fragment information obtained through secret sharing.

Means to Solve the Problems

An image corresponding to fragment information is set as verification information, and the verification information is securely stored or secretly shared.

Effects of the Invention

According to the present invention, it is possible to detect tampering or corruption of fragment information.

BRIEF DESCRIPTION OF THE DRAWINGS

FIG. 1 is a block diagram illustrating a configuration of a secret sharing system according to embodiments;

DETAILED DESCRIPTION OF THE EMBODIMENTS

Figure 2A:
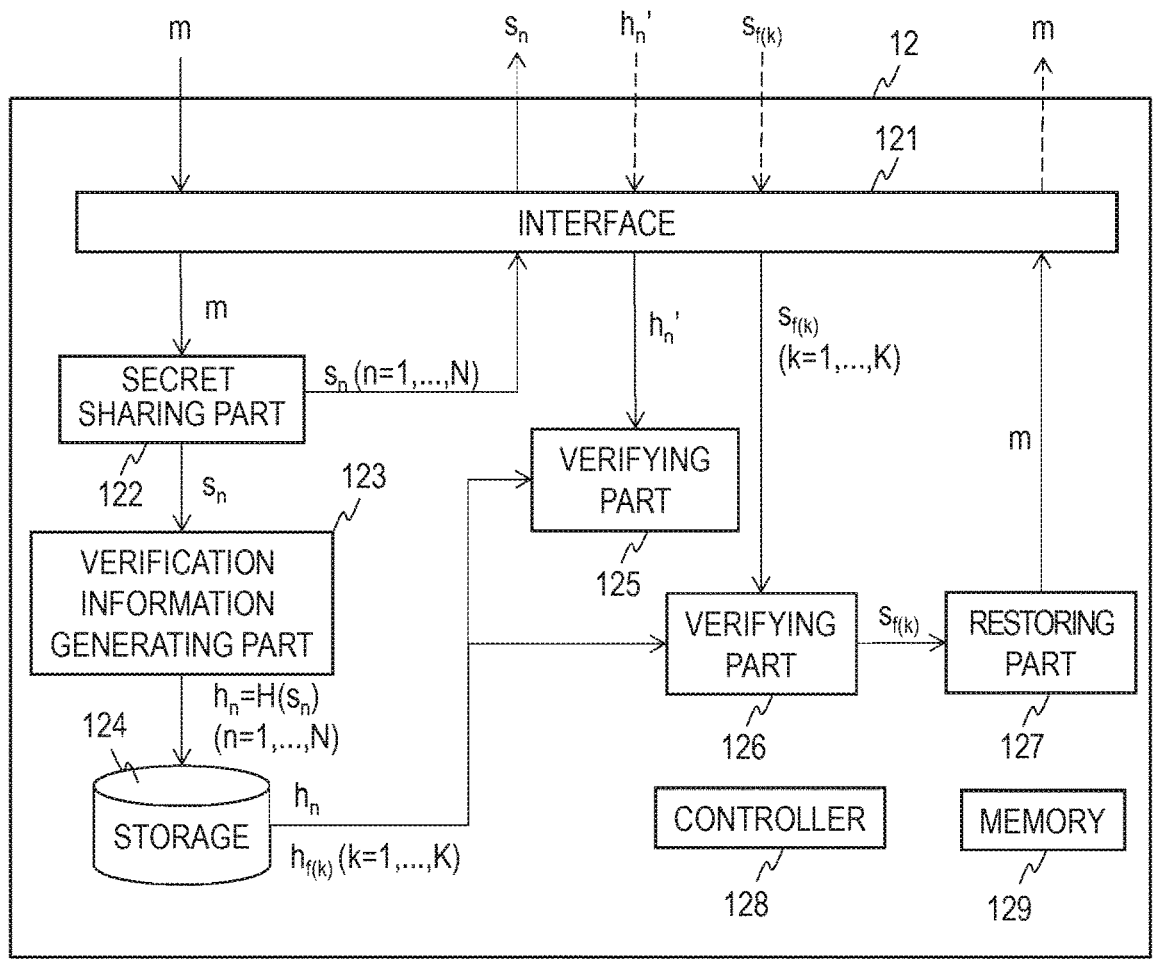
FIG. 2A is a block diagram illustrating a configuration of a security apparatus according to a first embodiment.

Embodiments of the present invention will be described below with reference to the drawings.

First Embodiment

In secret sharing processing of the present embodiment, a security apparatus applies secret sharing to processing information to obtain a plurality of pieces of fragment information, obtains verification information which is an image of the fragment information through mapping, and stores (securely stores) the verification information in a storage. In restoration processing of the present embodiment, the security apparatus accepts input of fragment information required for restoration, compares fourth verification information which is an image of the inputted fragment information through mapping with the verification information stored in the storage, and restores the processing information from fragment information corresponding to the fourth verification information which matches the verification information. When the fragment information is tampered or corrupted, the fourth verification information does not match the verification information. Therefore, it is possible to detect tampering or corruption of the fragment information. The present embodiment will be described in detail below.

<Configuration>

As illustrated in FIG. 1, a secret sharing system 1 of the present embodiment has a client apparatus 11, a security apparatus 12, and a plurality of storage apparatuses 13-1 to 13-N (where N is an integer equal to or greater than two). The security apparatus 12 is configured to be able to communicate with the client apparatus 11 through a secure network where attack from outside is interrupted. That is, the client apparatus 11 and the security apparatus 12 are configured on a secure network where attack from outside is interrupted. For example, the client apparatus 11 and the security apparatus 12 are configured on a secure network within a location of a company which utilizes the secret sharing system 1. Further, the security apparatus 12 is configured to be able to communicate with the storage apparatuses 13-1 to 13-N through a network 14. While the network 14 is, for example, an unsecure network such as the Internet, the network 14 may be a secure network where attack from outside is interrupted.

<<Client Apparatus 11>>

The client apparatus 11 transmits processing information (such as a file and data) to be shared to the security apparatus 12 or requests the security apparatus 12 to restore original processing information from shared fragment information (share). The client apparatus 11 is, for example, configured with hardware such as an integrated circuit, which does not require a program. The client apparatus 11 executes a program on the security apparatus 12 in which processing information is stored in advance. Alternatively, the client apparatus 11 may be an apparatus configured by loading a predetermined program to a general-purpose or dedicated computer (such as, for example, a personal computer and a server computer) comprising a CPU (central processing unit), a RAM (random-access memory), a communication apparatus, or the like.

<<Security Apparatus 12>>

The security apparatus 12 performs sharing processing/restoration processing of processing information according to a predetermined secret sharing scheme based on the request from the client apparatus 11. In accordance with these processing, the security apparatus 12 transmits/receives fragment information to/from each of the storage apparatuses (storages) 13-1 to 13-N. Further, the security apparatus 12 stores an image of the fragment information through mapping upon sharing processing and detects tampering or corruption of the fragment information as needed. It should be noted that, in secret sharing, the processing information is shared into N (where N≥2) pieces of fragment information so that the processing information is restored only when the number of obtained pieces of the fragment information is equal to or larger than a threshold K (where K≥1). A secret sharing scheme which satisfies K=N is referred to as an N-out-of-N sharing scheme, and a secret sharing scheme which satisfies K<N is referred to as a K-out-of-N sharing scheme (see, for example, Non-patent literature 1). While, if K or more correct pieces of fragment information are collected, it is possible to restore the processing information, if K or more correct pieces of fragment information are not collected, information regarding the processing information cannot be obtained at all. The number of sharing pieces N and the number of pieces of fragment information K required for restoration can be freely set. Further, an "image B of A through mapping" may be a function value B obtained by inputting A to a predetermined function, or an output value B obtained by inputting A to a predetermined algorithm. In other words, the "image B of A through mapping" is a "value B=f(A) obtained by applying mapping f to A". That is, the "image B of A through mapping" is the "image B=f(A) of A under the mapping f". Examples of the "mapping" comprise mapping having one-wayness and collision resistance. For example, a cryptographic hash function or hash algorithm such as SHA-256 may be used as the mapping, or a common key cryptographic function or common key cryptographic algorithm such as AES (Advanced Encryption Standard) and Camellia® may be used as the mapping. When the "mapping" is a cryptographic hash function or hash algorithm, the "image B of A through mapping" is a hash value of A, and, when the "mapping" is a common key cryptographic function or common key cryptographic algorithm, the "image B of A through mapping" is a cryptograph of A. It should be noted that when "mapping" has one-wayness, fragment information cannot be obtained from an image of the fragment information through mapping, so that security is high. Therefore, it is desirable that the "mapping" has one-wayness. Further, when "mapping" has collision resistance, it is possible to detect tampered or corrupted fragment information with very high probability. Therefore, it is desirable that the "mapping" has collision resistance. However, depending on the application, a function or algorithm which does not have one-wayness may be used as the "mapping", or a function or algorithm which does not have collision resistance may be used as the "mapping".

The security apparatus 12 is, for example, configured to load a predetermined program to a general-purpose or dedicated computer comprising a CPU, a RAM, a communication apparatus, or the like. As illustrated in FIG. 2A, the security apparatus 12 of the present embodiment has an interface 121 (an "output part", a "second input part"), a secret sharing part 122, a verification information generating part 123, a storage 124, verifying parts 125 and 126, a restoring part 127, a controller 128 and a memory 129. The security apparatus 12 executes each processing under control of the controller 128. While description will be omitted below, data inputted to the interface 121 or data obtained at each part is accordingly stored in the memory 129 or the storage 124. The data stored in the memory 129 or the storage 124 is loaded to each part as necessary.

<<Storage Apparatus 13-$n$ (where $n=1, \ldots, N$)>>

Figure 2B:
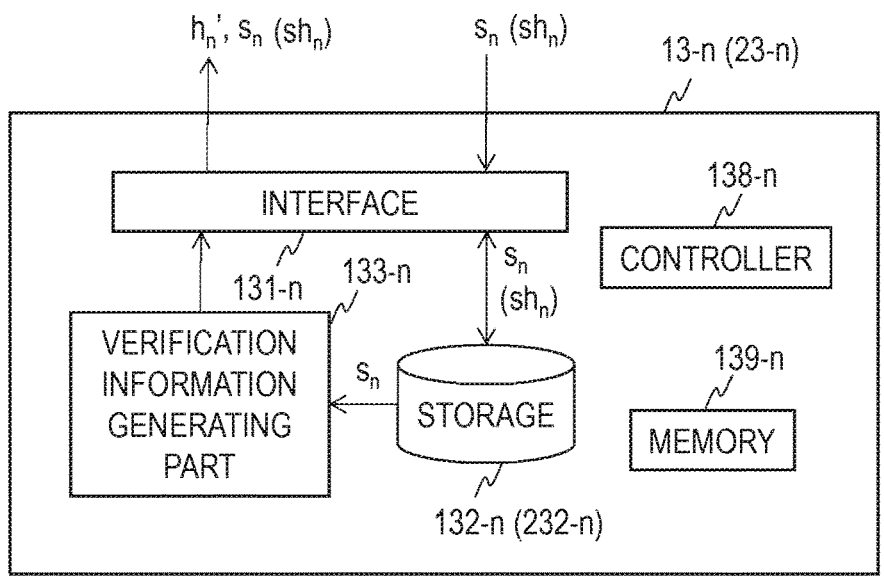
FIG. 2B is a block diagram illustrating a configuration of a storage apparatus according to the first embodiment and a second embodiment.

The storage apparatus 13-$n$ is, for example, a storage of a data center, and stores the above-described fragment information. TO improve availability, it is desirable that the storage apparatuses 13-$n$ are provided at locations geographically distant from each other. The storage apparatus 13-$n$ is, for example, an apparatus configured by loading a predetermined program to a general-purpose or dedicated computer comprising a CPU, a RAM, a communication apparatus, or the like. As illustrated in FIG. 2B, the storage apparatus 13-$n$ of the present embodiment has an interface 131-$n$, a storage 132-$n$, a verification information generating part 133-$n$, a controller 138-$n$ and a memory 139-$n$. The storage apparatus 13-$n$ executes each processing under control of the controller 138-$n$. While description will be omitted below, data inputted to the interface 131-$n$ or data obtained at each part is accordingly stored in the memory 139-$n$ or the storage 132-$n$. The data stored in the memory 139-$n$ or the storage 132-$n$ is loaded to each part as necessary.

<Sharing Processing>

Figure 3:
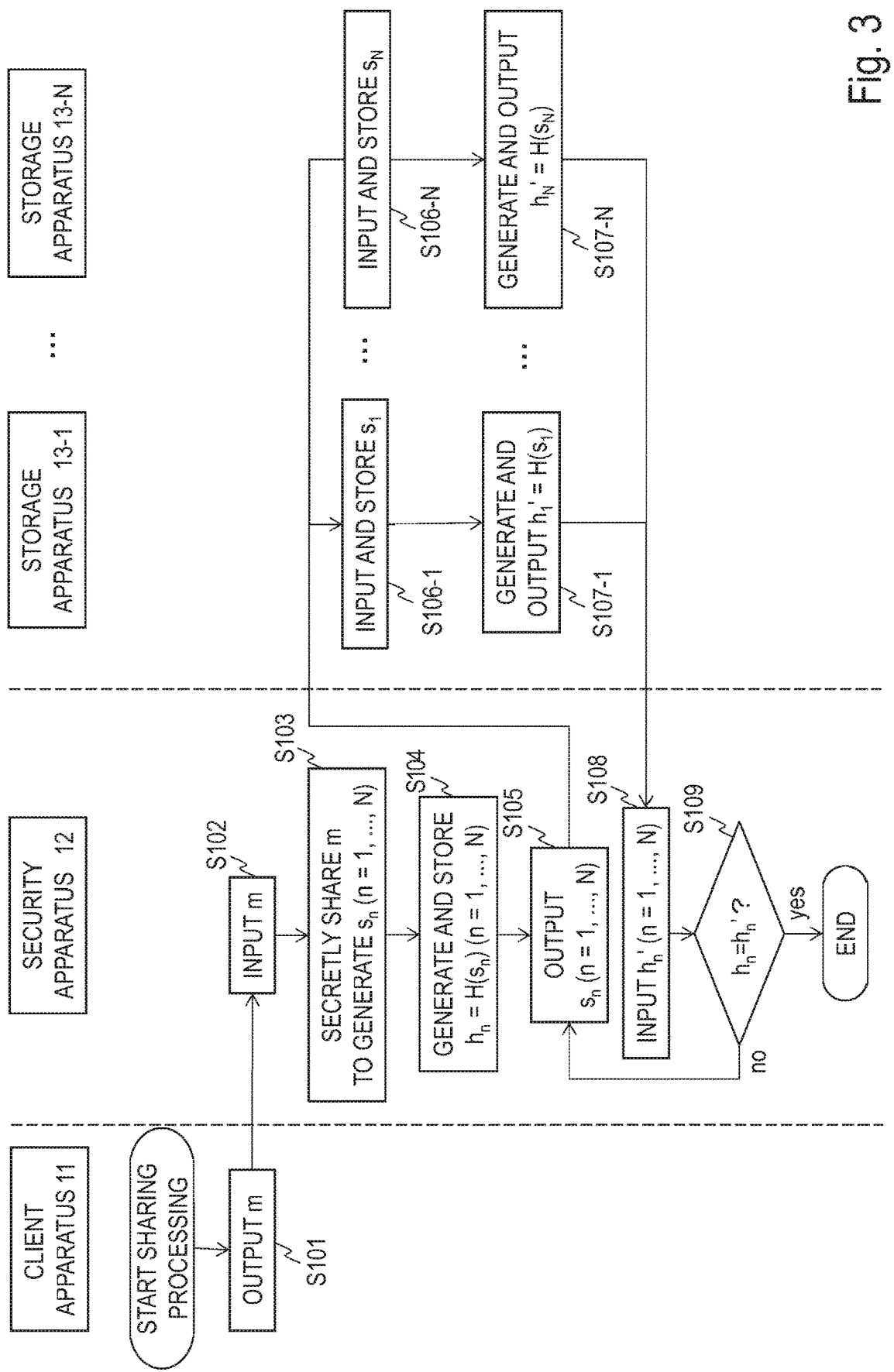
FIG. 3 is a flowchart for illustrating sharing processing according to the first and the second embodiments.

Sharing processing of the present embodiment will be described next using FIG. 3.

First, the client apparatus 11 transmits (outputs) processing information m to be shared to the security apparatus 12 along with a sharing request. The processing information m may be any information. Examples of the processing information m comprise a file such as a document, a table, an image, a moving image and sound, and data such as a numerical value (step S101).

The processing information m is received (input is accepted) at the interface 121 of the security apparatus 12 (FIG. 2A) and transmitted to the secret sharing part 122 (step S102). The secret sharing part 122 applies secret sharing to the processing information m according to a predetermined secret sharing scheme, and obtains and outputs N (a plurality of) pieces of fragment information $s_n$ (where $n=1, \ldots, N$). The N pieces of fragment information $s_n$ are transmitted to the verification information generating part 123 and the interface 121 (step S103). The verification information generating part 123 obtains and outputs verification information $h_n = H(s_n)$ (where n=1, ..., N) which is an image of the inputted fragment information $s_n$ through mapping H. As mentioned above, examples of the mapping H comprise a cryptographic hash function or hash algorithm, or a common key cryptographic function or common key cryptographic algorithm, and examples of the verification information $h_n$ comprise a hash value of the fragment information $s_n$, and a cryptograph of the fragment information $s_n$. The N pieces of verification information $h_n$ (where n=1, ..., N) are securely stored in the storage 124 (step S104). The interface 121 outputs the N pieces of fragment information $s_n$ and transmits each piece to the storage apparatus 13-$n$ (where n=1, N) via the network 14. That is, the fragment information $s_1$ is transmitted to the storage apparatus 13-1, the fragment information $s_2$ is transmitted to the storage apparatus 13-2, the fragment information $s_N$ is transmitted to the storage apparatus 13-N (step S105).

Each piece of fragment information $s_n$ is received (input is accepted) at the interface 131-$n$ of each storage apparatus 13-$n$ (FIG. 2B), and stored in each storage 132-$n$ (step S106-$n$, where n=1, ..., N). The verification information generating part 133-$n$ of each storage apparatus 13-$n$ reads out the fragment information $s_n$ from each storage 132-$n$, and obtains and outputs verification information $h_n' = H(s_n)$ (where n=1, ..., N) which is an image of the fragment information $s_n$ through mapping H. The mapping H is the same as that used in the verification information generating part 123 of the security apparatus 12. Each piece of verification information $h_n'$ is transmitted to the security apparatus 12 via the network 14 (step S107-$n$, where n=1, ..., N).

Each piece of verification information $h_n'$ is received (input is accepted) at the interface 121 of the security apparatus 12 (FIG. 2A) and transmitted to the verifying part 125 (step S108). The verifying part 125 verifies whether the transmitted verification information $h_n'$ matches the verification information $h_n$ read out from the storage 124 for each of n=1, ..., N (step S109). Here, when $h_n \neq h_n'$ for any of n=1, ..., N, the controller 128 issues an instruction to return the processing to step S105 and perform the processing of step S105 to S109 again. While all the processing of step S105 to S109 may be performed again, it is also possible to perform the processing of step S105 to S109 again only for n for which $h_n \neq h_n'$ in step S109. On the other hand, when $h_n = h_n'$ for all of n=1, ..., N, the processing ends.

<Restoration Processing>

Figure 4:
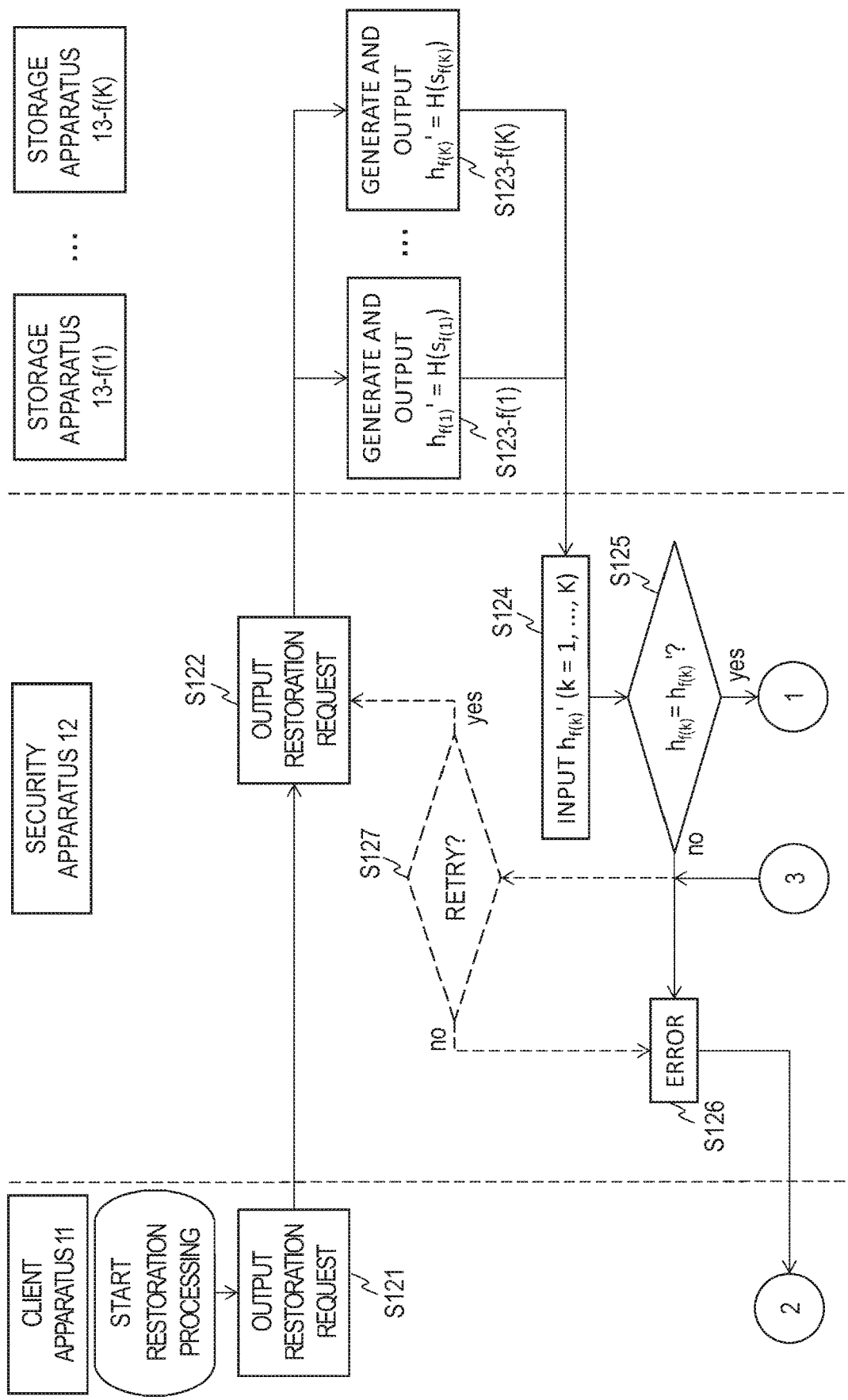
FIG. 4 is a flowchart for illustrating restoration processing according to the first and the second embodiments.
Figure 5:
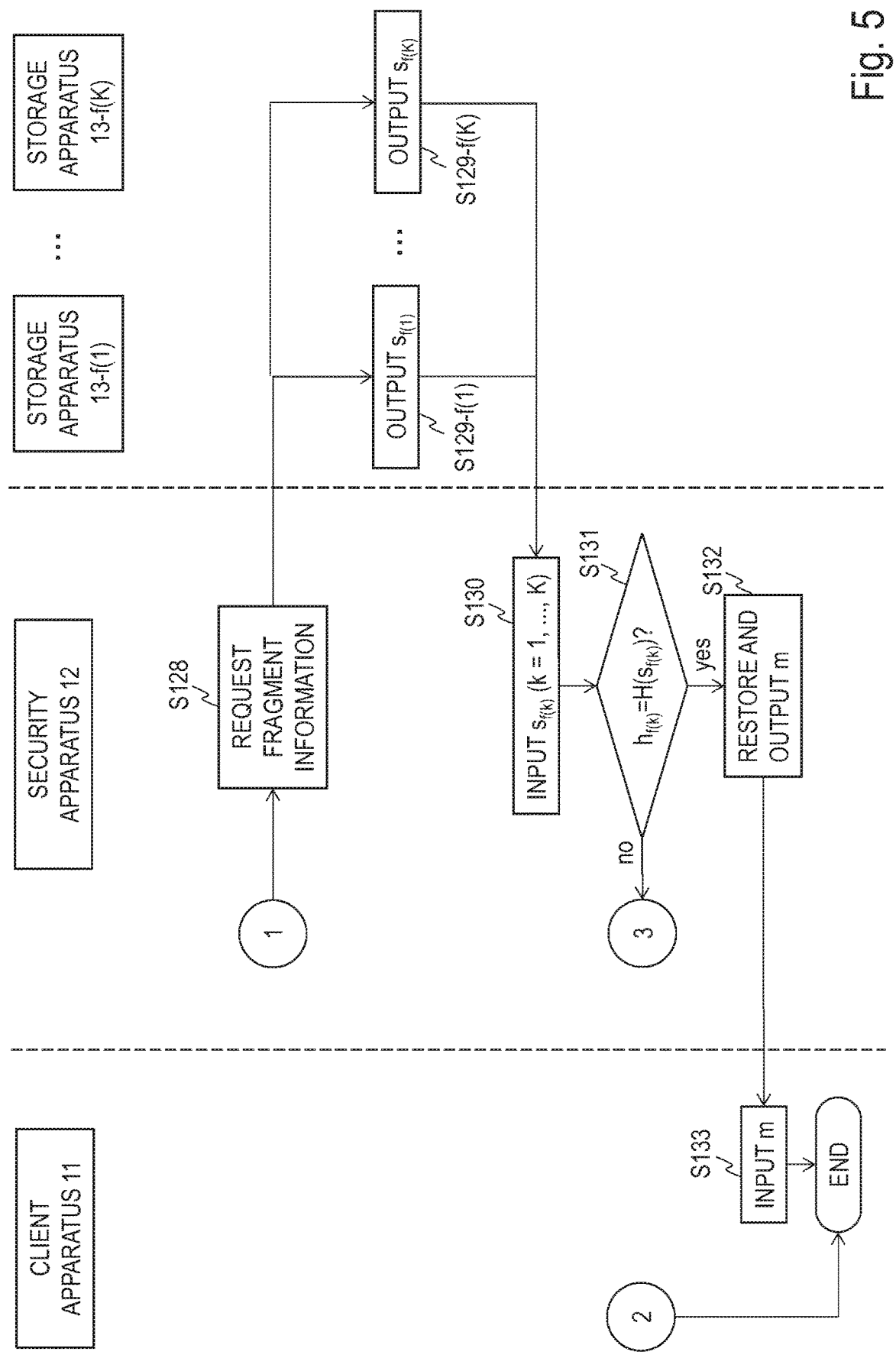
FIG. 5 is a flowchart for illustrating restoration processing according to the first and the second embodiments.

Restoration processing of the present embodiment will be described next using FIG. 4 and FIG. 5.

First, the client apparatus 11 transmits a restoration request to the security apparatus 12 (step S121). The interface 121 of the security apparatus 12 (FIG. 2A) receives this restoration request. The interface 121 further transmits restoration requests to K (where K≤N) storage apparatuses 13-$f(1)$ to 13-$f(K)$ out of N storage apparatuses 13-1 to 13-N via the network 14. Here, f is injection and satisfies $\{f(1), ..., f(K)\} \subseteq \{1, ..., N\}$. There is no limitation to a method for selecting K f(1), ..., f(K). For example, $\{f(1), ..., f(K)\}$ may be randomly selected from $\{1, ..., N\}$, or $\{f(1), ..., f(K)\}$ may be selected according to a predetermined priority order. For example, storage apparatuses 13-$f(1)$, ..., 13-$f(K)$ may be selected in descending order of security (step S122).

The restoration request is received at the interface 131-$f(k)$ (where k=1, ..., K) of each storage apparatus 13-$f(k)$ (FIG. 2B). The verification information generating part 133-$f(k)$ of each storage apparatus 13-$f(k)$ which receives the restoration request reads out fragment information $s_{f(k)}$ from the storage 132-$f(k)$, and obtains and outputs verification information $h_{f(k)}' = H(s_{f(k)})$ (where k=1, ..., K) which is an image of the fragment information $s_{f(k)}$ through mapping H. The mapping H is the same as that used in the verification information generating part 123 of the security apparatus 12. Each piece of verification information $h_{f(k)}'$ is transmitted to the security apparatus 12 via the network 14 (step S123-$f(k)$ where k=1, ..., K).

Each piece of verification information $h_{f(k)}'$ is received (input is accepted) at the interface 121 of the security apparatus 12 (FIG. 2A) and transmitted to the verifying part 125 (step S124). The verifying part 125 verifies whether the transmitted verification information $h_{f(k)}'$ matches the verification information $h_{f(k)}$ read out from the storage 124 for each of k=1, ..., K (step S125). Here, when $h_{f(k)} \neq h_{f(k)}'$ for any of k=1, ..., K, the interface 121 outputs an error, which is transmitted to the client apparatus 11, and the processing ends (step S126). On the other hand, when $h_{f(k)} = h_{f(k)}'$ for all of k=1, ..., K, the interface 121 transmits fragment information requests to the storage apparatuses 13-$f(1)$ to 13-$f(K)$ which transmit the restoration requests in step S122 via the network 14 (step S128).

Each storage apparatus 13-$f(k)$ (FIG. 2B) to which the fragment information request is transmitted reads out the fragment information $s_{f(k)}$ from the storage 132-$f(k)$ and transmits the fragment information $s_{f(k)}$ to the interface 131-$f(k)$. The interface 131-$f(k)$ transmits the fragment information $s_{f(k)}$ to the security apparatus 12 via the network 14 (step S129-$f(k)$ where k=1, ..., K).

The interface 121 of the security apparatus 12 (FIG. 2A) receives (accepts input) the fragment information $s_{f(k)}$ (where k=1, ..., K) and transmits the fragment information $s_{f(k)}$ to the verifying part 126 (step S130). The verifying part 126 compares verification information (fourth verification information) $H(s_{f(k)})$ which is an image of the transmitted fragment information $s_{f(k)}$ through mapping H with the verification information $h_{f(k)}$ stored in the storage 124 for each of k=1, ..., K. That is, the verifying part 126 generates verification information $H(s_{f(k)})$ which is an image of the transmitted fragment information $s_{f(k)}$, through mapping for each of k=1, ..., K, reads out the verification information $h_{f(k)}$ from the storage 124 and determines whether the generated verification information $H(s_{f(k)})$ matches the read out verification information $h_{f(k)}$ ($h_{f(k)} = H(s_{f(k)})$). The mapping H is the same as that used in the verification information generating part 123 (step S131). Here, if $h_{f(k)} \neq H(s_{f(k)})$ for any of k=1, ..., K, the interface 121 outputs an error, which is transmitted to the client apparatus 11, and the processing ends (step S126). On the other hand, if $h_{f(k)} = H(s_{f(k)})$ for all of k=1, ..., K, fragment information $s_{f(k)}$ (where k=1, ..., K) corresponding to the verification information $H(s_{f(k)})$ for which $h_{f(k)} = H(s_{f(k)})$ is transmitted to the restoring part 127. The restoring part 127 restores and outputs the processing information in according to the secret sharing scheme in step S103 using the inputted K pieces of fragment information $s_{f(k)}$ (where k=1, ..., K). The processing information m is inputted to the interface 121, and the interface 121 transmits (outputs) the processing information m to the client apparatus 11 (step S132). The processing information m is received (input is accepted) at the client apparatus 11, and the processing ends (step S133).

Features of Present Embodiment

Because, in the present embodiment, the verification information $h_n$, $h_n = H(s_n)$ being an image of the fragment information $s_n$ through mapping, is securely stored in the security apparatus 12, it is possible to detect tampering or corruption of the fragment information $s_n$. Further, because every time the fragment information $s_n$ is transmitted/received via the network 14, the fragment information $s_n$ stored in the storage apparatus 13-$n$ is verified using the verification information $h_n$, it is possible to detect tampering or corruption of the fragment information $s_n$ early. Still further, because the verification information $h_n$ is securely stored in the security apparatus 12, it is possible to prevent attack against the verification information $h_n$ from outside, so that it is possible to secure information-theoretic security of the verification information $h_n$.

In the above description, when it is determined in step S125 that $h_{f(k)} \neq h_{f(k)}'$, and when it is determined in step S131 that $h_{f(k)} \neq H(s_{f(k)})$, the interface 121 outputs an error, which is transmitted to the client apparatus 11, and the processing ends (step S126). However, as indicated with a dashed line in FIG. 4, when it is determined in step S125 that $h_{f(k)} \neq h_{f(k)}'$, and/or, when it is determined in step S131 that $h_{f(k)} \neq H(s_{f(k)})$, the controller 128 may determine whether or not retry is possible (step S127). Here, when retry is possible, the processing returns to step S122, new K storage apparatuses 13-$f(1)$ to 13-$f(K)$ are selected, and the processing after step S122 is performed again, while, when retry is not possible, the interface 121 outputs an error, which is transmitted to the client apparatus 11, and the processing ends (step S126). Examples of a "case where retry is possible" comprise, for example, a case where there exists a storage apparatus which is not yet selected in step S122 out of N storage apparatuses 13-1 to 13-N (assuming that K<N), and a case where the number of times of retry (for example, the number of times it is determined that retry is possible in step S127) is less than a predetermined number of times. Further, when it is determined in step S127 that retry is possible, it is also possible to update f(k') to f(k'') only for f(k') (where k'=1, . . . , K) for which it is determined that $h_{f(k)} \neq H_{f(k)}'$ or $h_{f(k)} \neq H(s_{f(k)})$ and perform the processing after step S122 again only for the updated f(k'').

Further, in the above description, an image $H(s_n)$ of each piece of fragment information $s_n$ through mapping is set as each piece of verification information. That is, pieces of fragment information $s_n$ correspond to pieces of verification information $H(s_n)$ on a one-to-one basis. However, an image of coupled information of a plurality of pieces of fragment information $s_n$ through mapping may be set as the verification information. In verification in this case, it is determined whether an image of the coupled information of the plurality of pieces of fragment information $s_n$ through mapping is equal to the verification information.

Further, in the above description, every time the fragment information is transmitted/received via the network 14, the fragment information $s_n$ stored in the storage apparatus 13-$n$ is verified using the verification information $h_n$ (step S107-$n$, S108, S109, S123-$f(k)$, S124 and S125). However, at least part of the verification may be omitted. Alternatively, the fragment information $s_n$ stored in the storage apparatus 13-$n$ may be verified using the verification information $h_n$ as necessary at a timing other than timings at which the fragment information is transmitted/received via the network 14.

Further, in the above description, the security apparatus 12 executes both sharing processing (step S102 to S105, S108 and S109) and restoration processing (step S122, S124, S125, S126, S127, S128, S130, S131 and S132). However, a security apparatus which executes sharing processing may be different from a restoration processing security apparatus, while, it is required that the restoration processing security apparatus be an apparatus which can utilize the verification information $h_n$ (where n=1, . . . , N) stored in the storage 124. Further, the verification information $h_n$ (where n=1, . . . , N) stored in the storage 124 may be copied, stored in another restoration processing security apparatus and utilized.

Second Embodiment

In the second embodiment, in addition to the matters described in the first embodiment, the verification information stored in the security apparatus is backed up by utilizing secret sharing in preparation for loss of a location of a company which utilizes the system (a location where a client apparatus, a security apparatus, or the like, is located) due to a natural disaster, or the like, or a failure of the security apparatus. Upon backup processing of the present embodiment, the security apparatus obtains second verification information which is an image of the verification information through mapping, applies secret sharing to coupled information comprising the verification information and the second verification information to obtain a plurality of pieces of second fragment information and outputs the second fragment information. The second fragment information is shared and stored in each storage apparatus. Upon backup restoration processing of the present embodiment, the security apparatus accepts input of the second fragment information, restores the coupled information from the inputted second fragment information, and compares third verification information which is an image of verification information through mapping, the verification information comprised in the restored coupled information (restoration information), with the second verification information comprised in the restored coupled information. When the second fragment information is tampered or corrupted, the third verification information does not match the second verification information. Therefore, it is possible to detect tampering or corruption of the second fragment information, so that it is possible to restore correct verification information. Details of the present embodiment will be described below. Only points different from those in the first embodiment will be described below, and matters common with those in the first embodiment will be omitted while the reference numerals used in the first embodiment are used.

<Configuration>

As illustrated in FIG. 1, the secret sharing system 2 of the present embodiment has a client apparatus 11, a security apparatus 22, and a plurality of storage apparatuses 23-1 to 23-N (where N is an integer equal to or greater than two). The security apparatus 22 is configured to be able to communicate with the client apparatus 11 through a secure network where attack from outside is interrupted. Further, the security apparatus 22 is configured to be able to communicate with the storage apparatuses 23-1 to 23-N through the network 14.

<<Client Apparatus 11>>

The client apparatus 11 is the same as that in the first embodiment.

<<Security Apparatus 22>>

Figure 6:
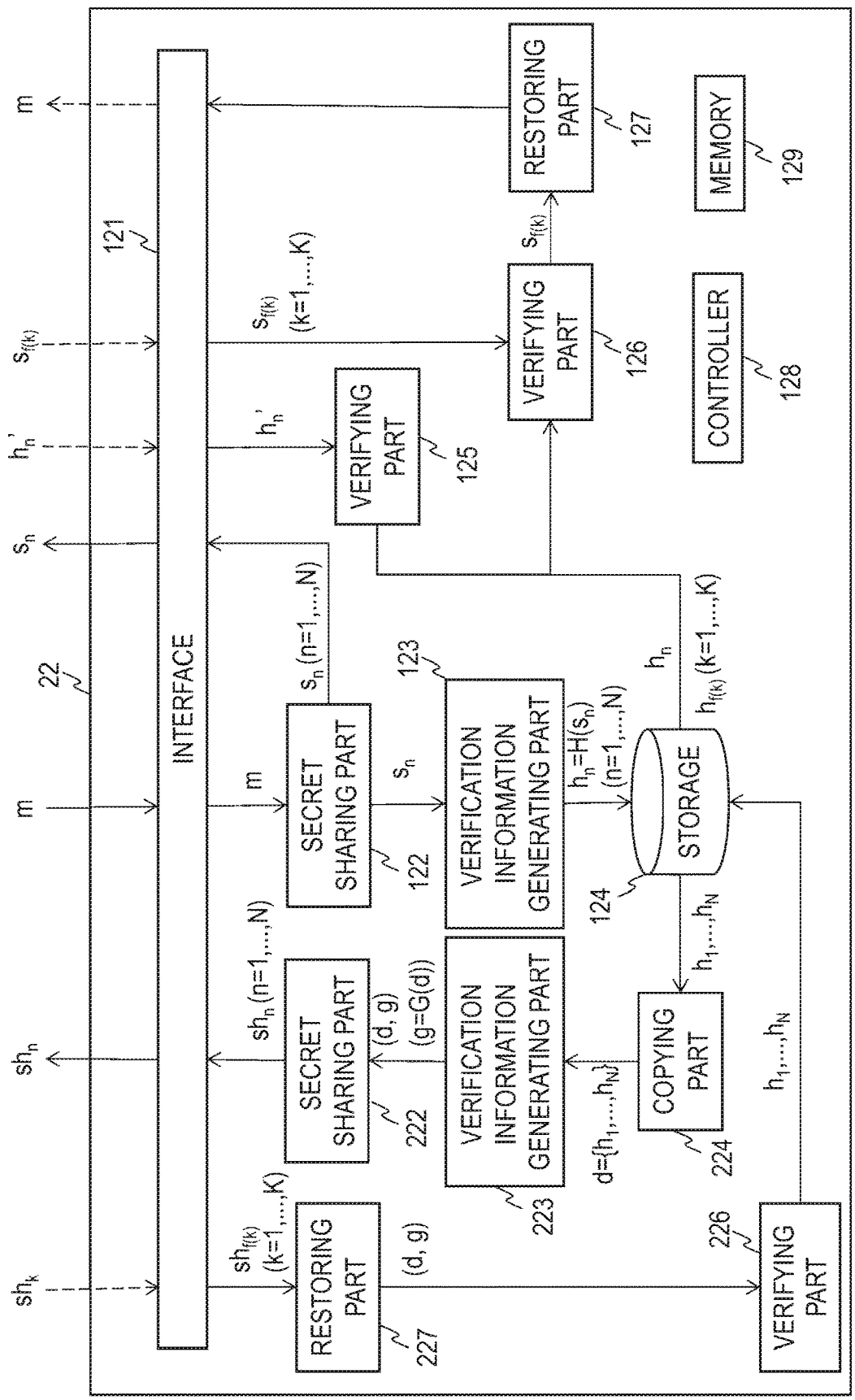
FIG. 6 is a block diagram illustrating a configuration of a security apparatus according to the second embodiment.

The security apparatus 22 performs sharing processing/restoration processing of processing information according to a predetermined secret sharing scheme based on a request from the client apparatus 11. These processing is the same as that in the first embodiment or the modified example of the first embodiment. Further, the security apparatus 22 performs backup processing of verification information stored in the storage at a predetermined moment. The security apparatus 22 is, for example, configured by loading a predetermined program to a general-purpose or dedicated computer comprising a CPU, a RAM, a communication apparatus, or the like. As illustrated in FIG. 6, the security apparatus 22 of the present embodiment has an interface 121 (an "input part", a "second input part", an "output part", a "second output part"), a secret sharing part 122, a verification information generating part 123, a storage 124, verifying parts 125 and 126, a restoring part 127, a controller 128, a memory 129, a secret sharing part 222, a verification information generating part 223, a copying part 224, a verifying part 226 and a restoring part 227. The security apparatus 22 executes each processing under control of the controller 128.

<<Storage Apparatus 23-$n$ (where n=1, ..., N)>>

The storage apparatus 23-$n$ stores second fragment information obtained through backup processing of the above-described verification information in addition to the fragment information described in the first embodiment. The storage apparatus 23-$n$ is, for example, an apparatus configured by loading a predetermined program to a general-purpose or dedicated computer comprising a CPU, a RAM, a communication apparatus, or the like. As illustrated in FIG. 2B, the storage apparatus 23-$n$ of the present embodiment has an interface 131-$n$, a storage 232-$n$, a verification information generating part 133-$n$, a controller 138-$n$ and a memory 139-$n$. The storage apparatus 23-$n$ executes each processing under control of the controller 138-$n$.

Sharing processing (FIG. 3) and restoration processing (FIG. 4 and FIG. 5) of the present embodiment are the same as those in the first embodiment or the modified example of the first embodiment except that the storage 232-$n$ is used in place of the storage 132-$n$. In the following description, only backup processing and backup restoration processing which are different points from the first embodiment or the modified example of the first embodiment will be described.

<Backup Processing>

First, the backup processing of the present embodiment will be described using FIG. 7.

The backup processing is executed at a predetermined moment. For example, the backup processing may be executed every time new verification information is stored in the storage 124 of the security apparatus 22, or may be executed for each predetermined period, or may be executed every time a request is received from the client apparatus 11.

When the backup processing is executed, first, the copying part 224 of the security apparatus 22 (FIG. 6) extracts verification information $h_n$ (where n=1, ..., N) from the storage 124, and obtains and outputs copy information $d=\{h_1, ..., h_N\}$ comprising all the verification information $h_n$. Examples of the copy information d comprise a dump file comprising all the verification information $h_n$ stored in the storage 124. The copy information d is transmitted to the verification information generating part 223 (step S201). The verification information generating part 223 obtains verification information (second verification information) g which is an image g=G(d) of the inputted copy information (verification information) d through mapping G. The verification information g can be also said as an image of the verification information $h_n$ through mapping. As mentioned above, examples of mapping G comprise a cryptographic hash function or hash algorithm, and a common key cryptographic function or common key cryptographic algorithm, and examples of the verification information g comprise a hash value of the copy information d and a cryptograph of the copy information d. The verification information generating part 223 further obtains and outputs coupled information (d, g) comprising the verification information g and the copy information d. Examples of the coupled information (d, g) comprise data in which verification information g such as a hash value is added to the head of the above-described dump file. The coupled information (d, g) is transmitted to the secret sharing part 222 (step S202). The secret sharing part 222 applies secret sharing to the inputted coupled information (d, g) according to a predetermined secret sharing scheme to obtain and output N (a plurality of) pieces of fragment information (second fragment information) $sh_n$ (where n=1, ..., N). The N pieces of fragment information $sh_n$ are transmitted to the interface 121 (step S203). The interface 121 outputs the N pieces of fragment information $sh_n$ and transmits each piece of the fragment information $sh_n$ to the storage apparatus 23-$n$ (where n=1, ..., N) via the network 14. That is, the fragment information $sh_1$ is transmitted to the storage apparatus 23-1, the fragment information $sh_2$ is transmitted to the storage apparatus 23-2, ..., and the fragment information $sh_N$ is transmitted to the storage apparatus 23-N (step S204).

Each piece of fragment information $sh_n$ is received (input is accepted) at the interface 131-$n$ of each storage apparatus 23-$n$ (FIG. 2B) and stored in each storage 232-$n$, and the processing ends (step S205-$n$, where n=1, ..., N).

<Backup Restoration Processing>

The backup restoration processing of the present embodiment will be described next using FIG. 8.

The backup restoration processing is performed in response to a request from the client apparatus 11. When the backup restoration processing is started, first, the interface 121 of the security apparatus 22 (FIG. 6) transmits restoration requests via the network 14 to K (where K≤N) storage apparatuses 23-$f(1)$ to 23-$f(K)$ out of N storage apparatuses 23-1 to 23-N. As with step S122 in the first embodiment, there is no limitation to a method for selecting K f(1), ..., f(K) (step S222).

The restoration request is received at the interface 131-$f(k)$ (where k=1, ..., K) of each storage apparatus 23-$f(k)$ (FIG. 2B). The storage apparatus 23-$f(k)$ to which the restoration request is transmitted reads out the fragment information $sh_{f(k)}$ from the storage 232-$f(k)$ and transmits the fragment information $sh_{f(k)}$ to the interface 131-$f(k)$. The interface 131-$f(k)$ transmits the fragment information $sh_{f(k)}$ to the security apparatus 22 via the network 14 (step S223-$f(k)$, where k=1, ..., K).

The interface 121 of the security apparatus 22 (FIG. 6) receives (accepts input) the fragment information (second fragment information) $sh_{f(k)}$ (where k=1, ..., K) and transmits the fragment information $sh_{f(k)}$ to the restoring part 227 (step S224). The restoring part 227 restores and outputs coupled information (d, g) according to the secret sharing scheme in step S203 using the inputted K pieces of fragment information $sh_{f(k)}$ (where k=1, ..., K). The coupled information (d, g) is transmitted to the verifying part 226 (step S225). The verifying part 226 compares verification information (third verification information) G(d) which is an image G(d) of copy information (verification information) $d=\{h_1, ..., h_N\}$ comprised in the inputted coupled information (d, g) through mapping G with verification information (second verification information) g comprised in the inputted coupled information (d, g). That is, the verifying part 226 obtains the image G(d) of the copy information d through mapping G comprised in the inputted coupled information (d, g) and determines whether the obtained G(d) matches the verification information g comprised in the inputted coupled information (d, g) (whether g=G(d)). However, the mapping G is the same as that used in the verification information generating part 223 (step S226). Here, if g≠G(d), the interface 121 outputs an error, which is transmitted to the client apparatus 11, and the processing ends (step S227). On the other hand, if g=G(d), the verifying part 226 stores $h_1, \ldots, h_N$ indicated in the copy information $d=\{h_1, \ldots, h_N\}$ in the storage 124, and the processing ends (step S228).

Features of Present Embodiment

In the present embodiment, the verification information g which is an image g=G(d), the image g being obtained through the mapping G of the copy information (verification information) $d=\{h_1, \ldots, h_N\}$, is obtained, the coupled information (d, g) comprising the copy information (verification information) d and the verification information g is secretly shared to obtain N pieces of fragment information $sh_n$ (where n=1, ..., N), and each piece of fragment information $sh_n$ is stored in the storage apparatus 23-n. By this means, even when data in the storage 124 of the security apparatus 22 is corrupted, it is possible to restore verification information $h_1, \ldots, h_N$ from K pieces of fragment information $sh_{f(k)}$ (where k=1, ..., K). Further, by using the verification information g, it is possible to verify (verify integrity) whether the verification information $h_1, \ldots, h_N$ is tampered or corrupted. Still further, while, when the verification information g is stored in the storage 124 of the security apparatus 22, it is impossible to verify the verification information $h_1, \ldots, h_N$ if data in the storage 124 is corrupted, in the present embodiment, it is possible to restore the verification information g from the pieces of fragment information $sh_{f(k)}$ which are shared and stored in K storage apparatuses 23-f(k) (where k=1, ..., K). Therefore, it is possible to verify the verification information $h_1, \ldots, h_N$ even when the data in the storage 124 is corrupted.

In the above description, when it is determined in step S226 that g≠G(d), the interface 121 outputs an error, which is transmitted to the client apparatus 11, and the processing ends (step S227). However, as indicated with a dashed line in FIG. 8, when it is determined in step S226 that g≠G(d), the controller 128 may determine whether or not retry is possible (step S229). Here, when retry is possible, the processing is returned to step S222, new K storage apparatuses 23-f(1) to 23-f(K) are selected, and processing after step S222 is performed again, and, when retry is not possible, the interface 121 outputs an error, which is transmitted to the client apparatus 11, and the processing ends (step S227). Examples of a case where "retry is possible" comprise, for example, a case where, out of N storage apparatuses 23-1 to 23-N, there exists a storage apparatus which is not yet selected in step S222 (assuming that K<N), and a case where the number of times of retry (for example, the number of times it is determined that retry is possible in step S229) is less than a predetermined number of times.

Further, while, in the above description, the image G(d) is set as the verification information g, any verification information g may be set if an image of the verification information $h_n$ through mapping is set as the verification information g. For example, bit coupled values $|G(h_1)| \ldots , |G(h_N)|$ of $G(h_1), \ldots, G(h_N)$ may be set as the verification information g. The verification processing in step S226 in this case becomes processing in which G(d) is substituted with $|G(h_1)| \ldots , |G(h_N)|$.

Figure 7:
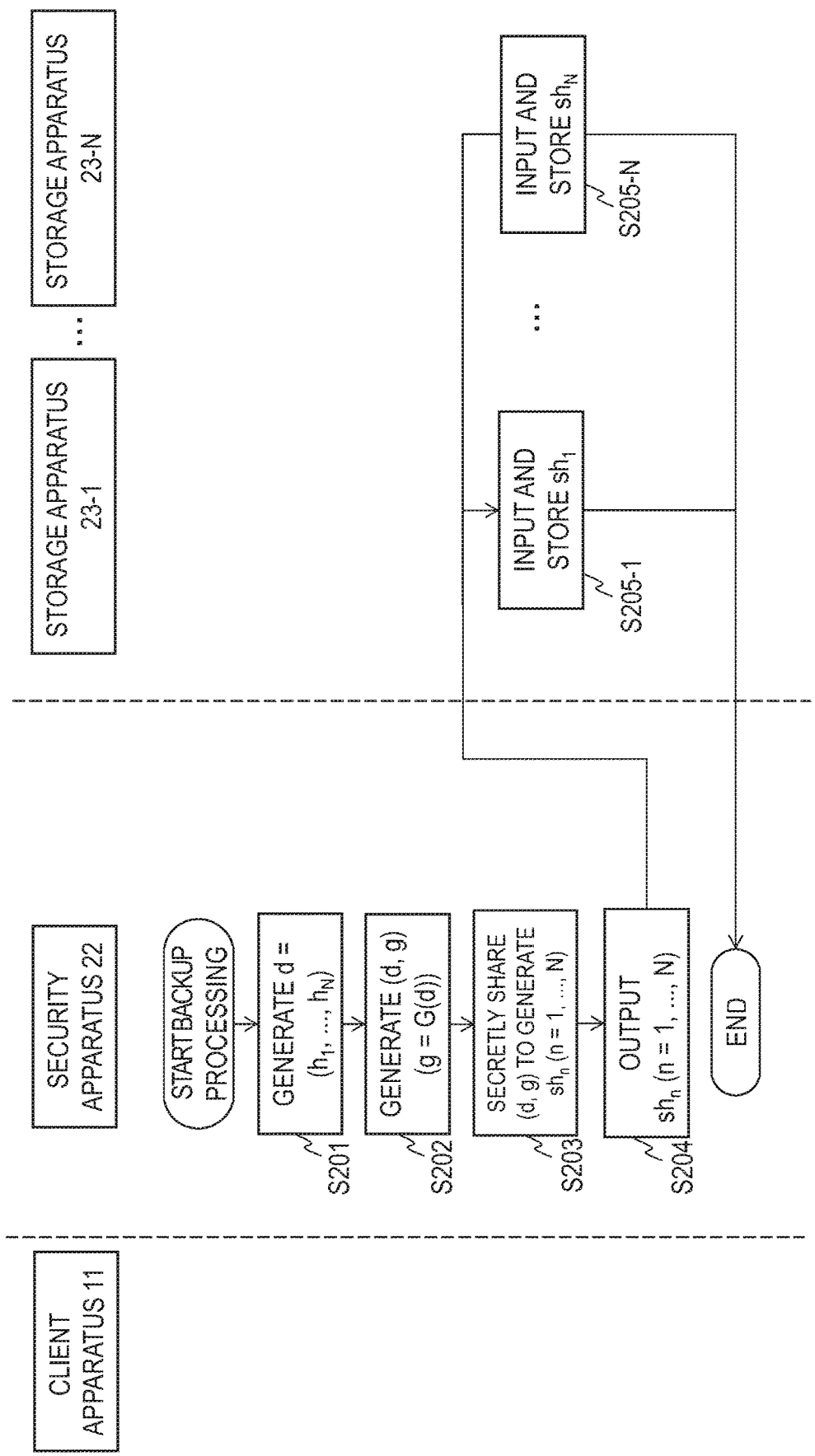
FIG. 7 is a flowchart for illustrating backup processing according to the second embodiment.

The backup processing (step S201 to 205-1, ..., N) in FIG. 7 may be executed using information comprising at least one of the verification information g and the copy information d in place of the coupled information (d, g) comprising the verification information (second verification information) g and the copy information (verification information) d. For example, in place of the coupled information (d, g), information a comprising the verification information g but not comprising the copy information d may be used or information β comprising the copy information d but not comprising the verification information g may be used. When the information a is used in place of the coupled information (d, g), for example, in addition to the backup processing in FIG. 7, further, the copy information d is secretly shared to N pieces of fragment information $sd_1, \ldots, sd_N$, and each piece of fragment information $sd_n$ is stored in each storage apparatus 23-n. When the information β is used in place of the coupled information (d, g), for example, in addition to the backup processing in FIG. 7, further, the verification information g is secretly shared to N pieces of fragment information $sg_1, \ldots, sg_N$, and each piece of fragment information $sg_n$ is stored in each storage apparatus 23-n. That is, the verification information g and the copy information d may be independently secretly shared.

Figure 8:
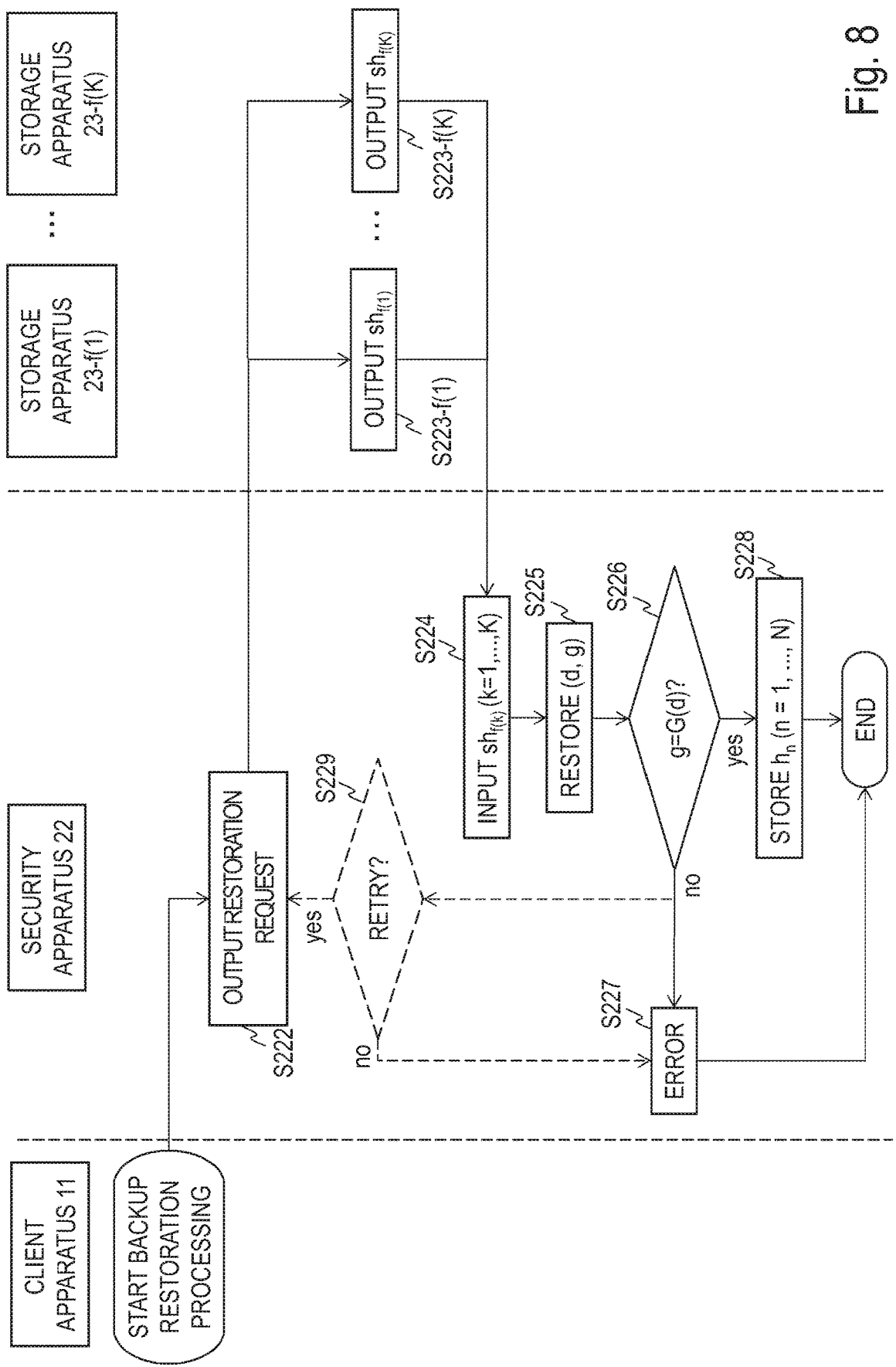
FIG. 8 is a flowchart for illustrating backup restoration processing according to the second embodiment.

In a similar manner, the backup restoration processing (step S222 to S228) in FIG. 8 may be executed using restoration information comprising at least one of the verification information g and the copy information d in place of the coupled information (d, g) comprising the verification information (second verification information) g and the copy information (verification information) d. For example, in place of the coupled information (d, g), restoration information a comprising the verification information g but not comprising the copy information d may be used, or restoration information β comprising the copy information d but not comprising the verification information g may be used. For example, when the restoration information a is used in place of the coupled information (d, g), prior to step S226, pieces of fragment information $sd_{f(1)}, \ldots, sd_{f(K)}$ outputted from K storage apparatuses 13-f(1) to 13-f(K) are further inputted to the security apparatus 22, the copy information d is restored from the pieces of fragment information $sd_{f(1)}, \ldots, sd_{f(K)}$, and processing after step S226 is executed. For example, when the restoration information β is used in place of the coupled information (d, g), prior to step S226, pieces of fragment information $sg_{f(1)}$ to $sg_{f(K)}$ outputted from K storage apparatuses 13-f(1) to 13-f(K) are further inputted to the security apparatus 22, the verification information g is restored from the pieces of fragment information $sg_{f(1)}$ to $sg_{f(K)}$, and the processing after step S226 is executed.

Third Embodiment

In secret sharing processing of the present embodiment, the security apparatus applies secret sharing to processing information to obtain a plurality of pieces of fragment information, obtains verification information which is an image of the processing information through mapping, applies secret sharing to the verification information to obtain a plurality of pieces of second fragment information, and outputs the fragment information and the second fragment information. The fragment information and the second fragment information are shared and stored in each storage apparatus. In restoration processing of the present embodiment, the security apparatus accepts input of the fragment information and the second fragment information, and compares the second verification information which is an image of the processing information restored from the inputted fragment information through mapping with verification information restored from the inputted second fragment information. When the fragment information is tampered or corrupted, the verification information does not match the second verification information. Therefore, it is possible to detect tampering or corruption of the fragment information. Further, in the present embodiment, because the verification information is also secretly shared, and the second fragment information obtained through secret sharing is also shared and stored in each storage apparatus, it is not necessary to provide a storage in which the security apparatus stores the verification information. Details of the present embodiment will be described below. In the following description, points different from those described so far will be mainly described.

<Configuration>

As illustrated in FIG. 1, the secret sharing system 3 of the present embodiment has a client apparatus 11, a security apparatus 32, and a plurality of storage apparatuses 33-1 to 33-N (where N is an integer equal to or greater than two). The security apparatus 32 is configured to be able to communicate with the client apparatus 11 through a secure network where attack from outside is interrupted. Further, the security apparatus 32 is configured to be able to communicate with the storage apparatuses 33-1 to 33-N through the network 14.

<<Client Apparatus 11>>

The client apparatus 11 is the same as that in the first embodiment.

<<Security Apparatus 32>>

Figure 9A:
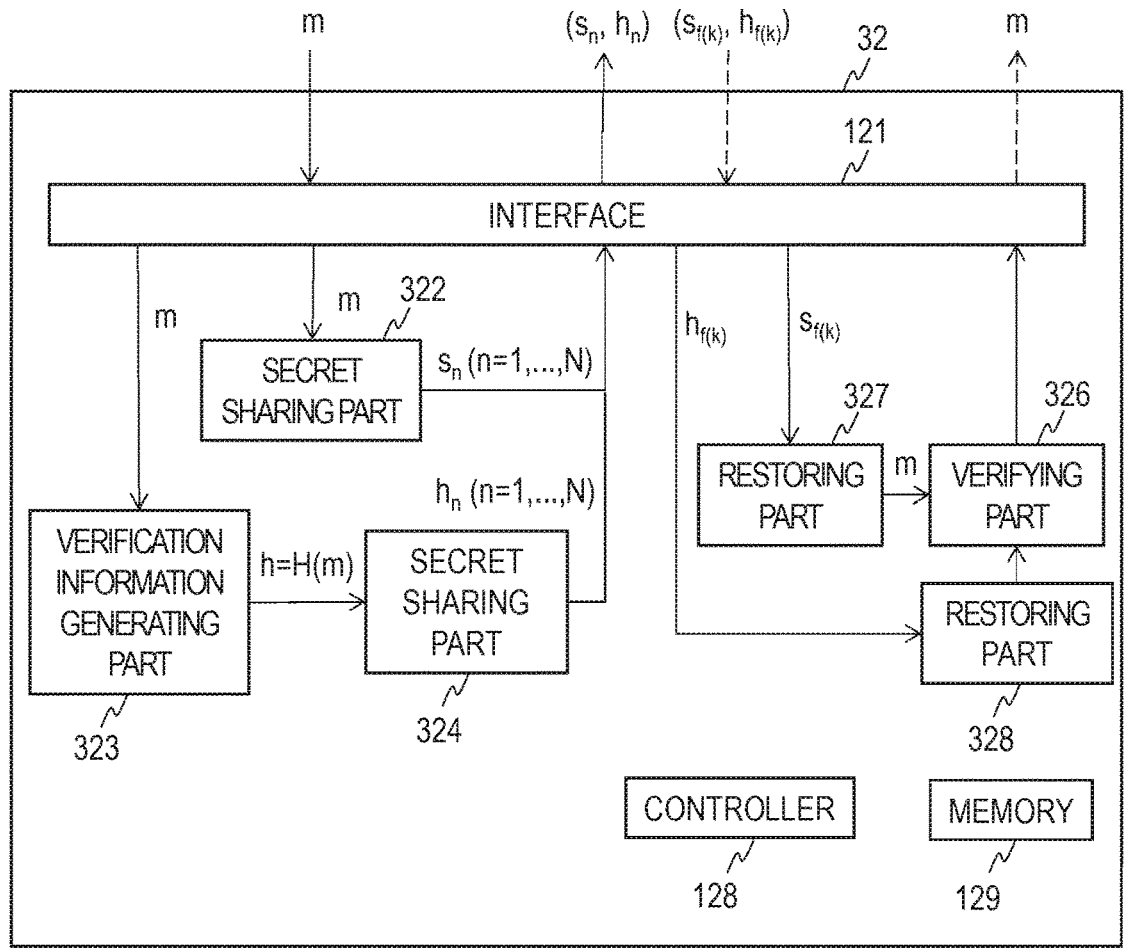
FIG. 9A is a block diagram illustrating a configuration of a security apparatus according to a third embodiment.

The security apparatus 32 performs sharing processing/restoration processing of processing information according to a predetermined secret sharing scheme based on a request from the client apparatus 11. In accordance with these processing, the security apparatus 32 transmits/receives fragment information to/from respective storage apparatuses 33-1 to 33-N. The security apparatus 32 is, for example, configured by loading a predetermined program to a general-purpose or dedicated computer comprising a CPU, a RAM, a communication apparatus, or the like. As illustrated in FIG. 9A, the security apparatus 32 of the present embodiment has an interface 121 (all "output part", an "input part"), secret sharing parts 322 and 324, a verification information generating part 323, a verifying part 326, restoring parts 327 and 328, a controller 128 and a memory 129. The security apparatus 32 executes each processing under control of the controller 128.

<<Storage Apparatus 33-$n$ (where n=1, . . . , N)>>

Figure 9B:
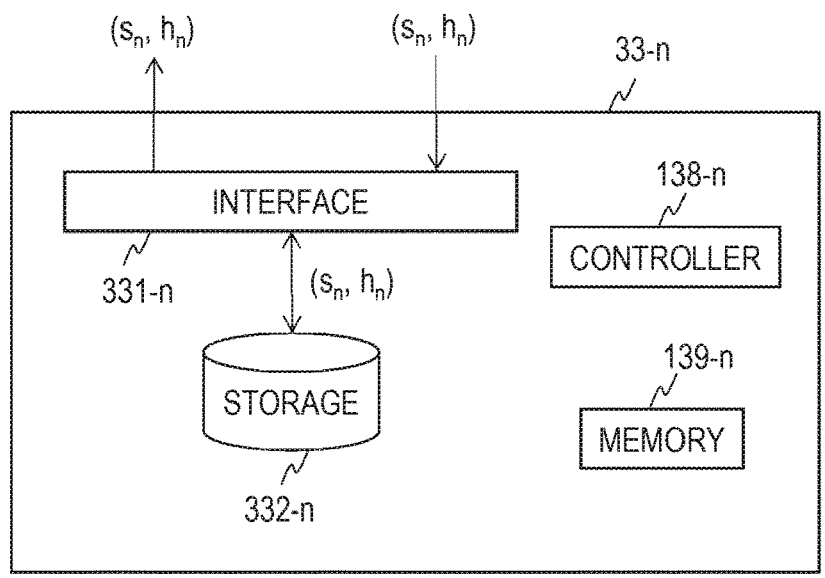
FIG. 9B is a block diagram illustrating a configuration of a storage apparatus according to the third embodiment.

The storage apparatus 33-$n$, which is, for example, a storage of a data center, stores the above-described fragment information and second fragment information. To improve availability, it is desirable that the storage apparatuses 33-$n$ are provided at locations geographically distant from each other. The storage apparatus 33-$n$ is, for example, an apparatus configured by loading a predetermined program to a general-purpose or dedicated computer comprising a CPU, a RAM, a communication apparatus, or the like. As illustrated in FIG. 9B, the storage apparatus 33-$n$ of the present embodiment has an interface 331-$n$, a storage 332-$n$, a controller 138-$n$ and a memory 139-$n$. The storage apparatus 33-$n$ executes each processing under control of the controller 138-$n$.

<Sharing Processing>

Figure 10:
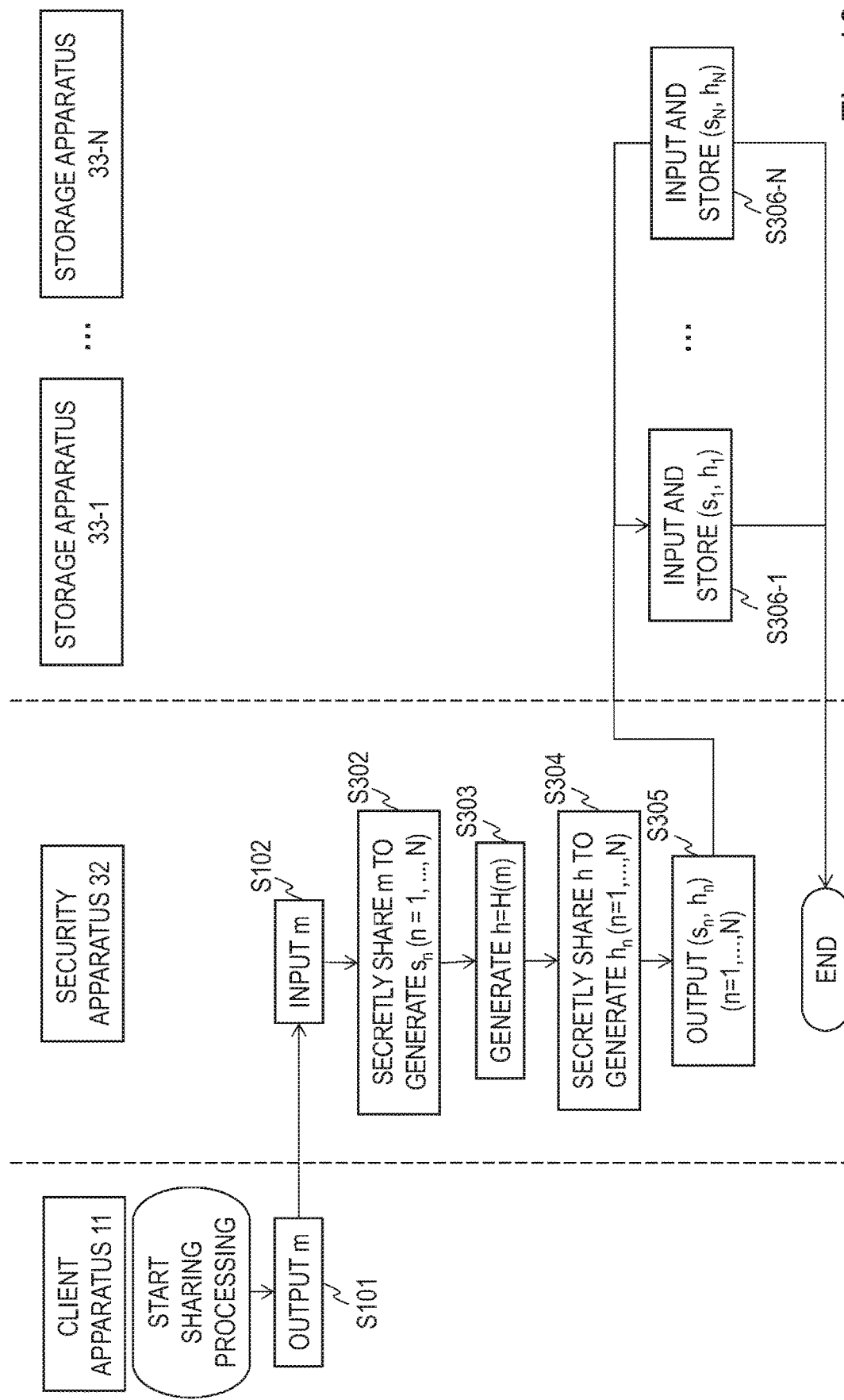
FIG. 10 is a flowchart for illustrating sharing processing according to the third embodiment.

Sharing processing of the present embodiment will be described next using FIG. 10.

First, the client apparatus 11 transmits (outputs) processing information m to be shared to the security apparatus 32 along with a sharing request (step S101).

The processing information m is received (input is accepted) at the interface 121 of the security apparatus 32 (FIG. 9A), and transmitted to the secret sharing part 322 and the verification information generating part 323 (step S102). The secret sharing part 322 applies secret sharing to the processing information m according to a predetermined secret sharing scheme and obtains and outputs N (a plurality of) pieces of fragment information $s_n$ (where n=1, . . . , N). The N pieces of fragment information $s_n$ are transmitted to the interface 121 (step S302). The verification information generating part 323 obtains and outputs verification information h=H(m), the verification information h being an image of the inputted processing information m through mapping H. The verification information h is transmitted to the secret sharing part 324 (step S303). The secret sharing part 324 applies secret sharing to the inputted verification information h according to a predetermined secret sharing scheme to obtain and output N (a plurality of) pieces of fragment information (second fragment information) $h_n$ (where n=1, . . . , N). The N pieces of verification information $h_n$ are transmitted to the interface 121 (step S304). The interface 121 outputs the N pieces of fragment information ($s_n$, $h_n$) and transmits each piece to the storage apparatus 33-$n$ (where n=1, . . . , N) via the network 14. That is, ($s_1$, $h_1$) is transmitted to the storage apparatus 33-1, ($s_2$, $h_2$) is transmitted to the storage apparatus 33-2, . . . , and ($s_N$, $h_N$) is transmitted to the storage apparatus 33-N (step S305).

Each ($s_n$, $h_n$) is received (input is accepted) at the interface 331-$n$ of each storage apparatus 33-$n$ (FIG. 9B), and stored in each storage 332-$n$ (step S306-$n$, where n=1, . . . , N), and the processing ends.

<Restoration Processing>

Figure 11:
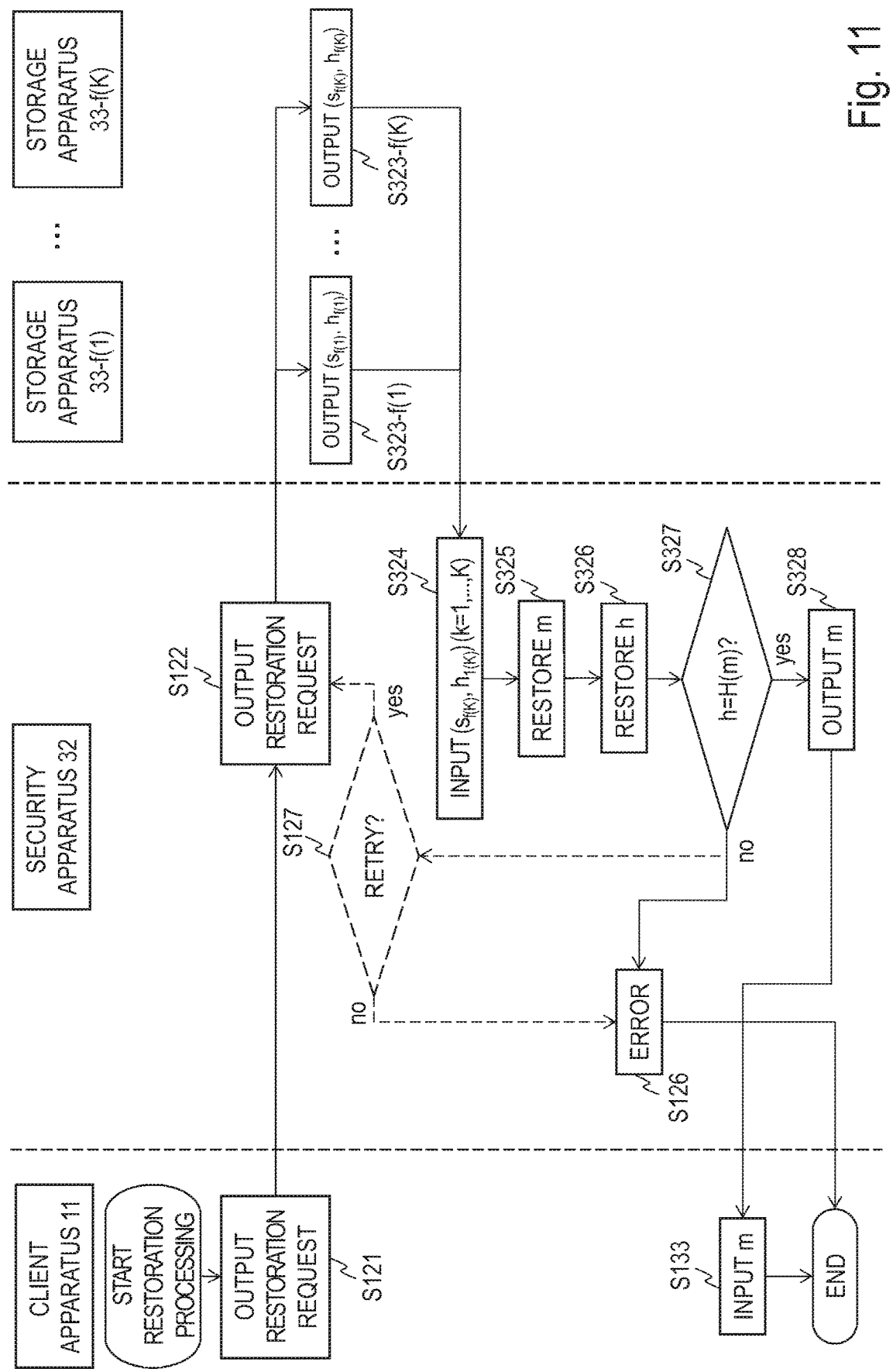
FIG. 11 is a flowchart for illustrating restoration processing according to the third embodiment.

Restoration processing of the present embodiment will be described next using FIG. 11.

First, the client apparatus 11 transmits a restoration request to the security apparatus 32 (step S121). The interface 121 of the security apparatus 32 (FIG. 9A) receives this restoration request. The interface 121 further transmits restoration requests to K (where K≤N) storage apparatuses 33-$f$(1) to 33-$f$(K) out of N storage apparatuses 33-1 to 33-N via the network 14. As with step S122 in the first embodiment, there is no limitation to a method for selecting K f(1), . . . , f(K) (step S122).

The restoration request is received at the interface 331-$f$(k) (where k=1, . . . , K) of each storage apparatus 33-$f$(k) (FIG. 9B). Each storage apparatus 33-$f$(k) which receives the restoration request reads out ($s_{f(k)}$, $h_{f(k)}$) from the storage 332-$f$(k) and transmits ($s_{f(k)}$, $h_{f(k)}$) to the interface 331-$f$(k). Each interface 331-$f$(k) transmits ($s_{f(k)}$, $h_{f(k)}$) to the security apparatus 32 via the network 14 (step S323-$f$(k), where k=1, . . . , K).

The interface 121 of the security apparatus 32 (FIG. 9A) receives (accepts input) ($s_{f(k)}$, $h_{f(k)}$) (where k=K), transmits fragment information $s_{f(k)}$ to the restoring part 327 and transmits verification information $h_{f(k)}$ to the restoring part 328 (step S324). The restoring part 327 restores and outputs processing information m from the inputted K pieces of fragment information $s_{f(k)}$ (where k=1, . . . , K) according to the above-mentioned secret sharing scheme. The processing information m is transmitted to the verifying part 326 (step S325). The restoring part 328 restores and outputs verification information h from the inputted K pieces of fragment information $h_{f(k)}$ (where k=1, . . . , K) according to the above-mentioned secret sharing scheme. The verification information h is transmitted to the verifying part 326 (step S326). The verifying part 326 compares the inputted verification information h (verification information h restored from the second fragment information $h_n$) with the verification information which is an image H(m) of the inputted processing information m through mapping H (the second verification information which is the image H(m) of the processing information m through mapping H, the processing information m restored from the fragment information $s_{f(k)}$). That is, the verifying part 326 obtains the image H(m) of the inputted processing information m through mapping H and determines whether the image H(m) matches the inputted verification information h (whether h=H(m)). The mapping H is the same as that used in the verification information generating part 323 of the security apparatus 32 (step S327). Here, if h≠H(m), the interface 121 outputs an error, which is transmitted to the client apparatus 11, and the processing ends (step S126). On the other hand, if h=H(m), the verifying part 326 outputs the processing information m, and the interface 121 transmits (outputs) the inputted processing information m to the client apparatus 11 (step S328). The processing information m is received (input is accepted) at the client apparatus 11, and the processing ends (step S133).

Features of Present Embodiment

In the present embodiment, the processing information m is secretly shared to thereby obtain fragment information $s_n$ (where n=1, ..., N), and the verification information h which is the image h=H(m) of the processing information m through mapping is secretly shared to thereby obtain fragment information $h_n$ (where n=1, ..., N), and each ($s_n$, $h_n$) is stored in each storage apparatus 33-n (where n=1, ..., N). Therefore, it is possible to detect tampering or corruption of the fragment information $s_n$. Further, because not only the fragment information $s_n$ obtained by secretly sharing the processing information m, but also the fragment information $h_n$ obtained by secretly sharing the verification information h of the processing information m is shared and stored in each storage apparatus 33-n, it is not necessary to store the verification information in the security apparatus 32.

In the above description, when it is determined in step S327 that h≠H(m), the interface 121 outputs an error, which is transmitted to the client apparatus 11, and the processing ends (step S126). However, as indicated with a dashed line in FIG. 11, when it is determined in step S327 that h≠H(m), the controller 128 may determine whether or not retry is possible (step S127). Here, if retry is possible, the processing is returned to step S122, new K storage apparatuses 33-f(1) to 33-f(K) are selected, and the processing after step S122 is performed again, and, if retry is not possible, the interface 121 outputs an error, which is transmitted to the client apparatus 11, and the processing ends (step S126).

Further, in the above description, the security apparatus 32 executes both sharing processing (step S102, and S302 to S305) and restoration processing (step S122, S126, S127, and S324 to S328). However, a security apparatus which executes sharing processing may be different from a restoration processing security apparatus.

Figure 12A:
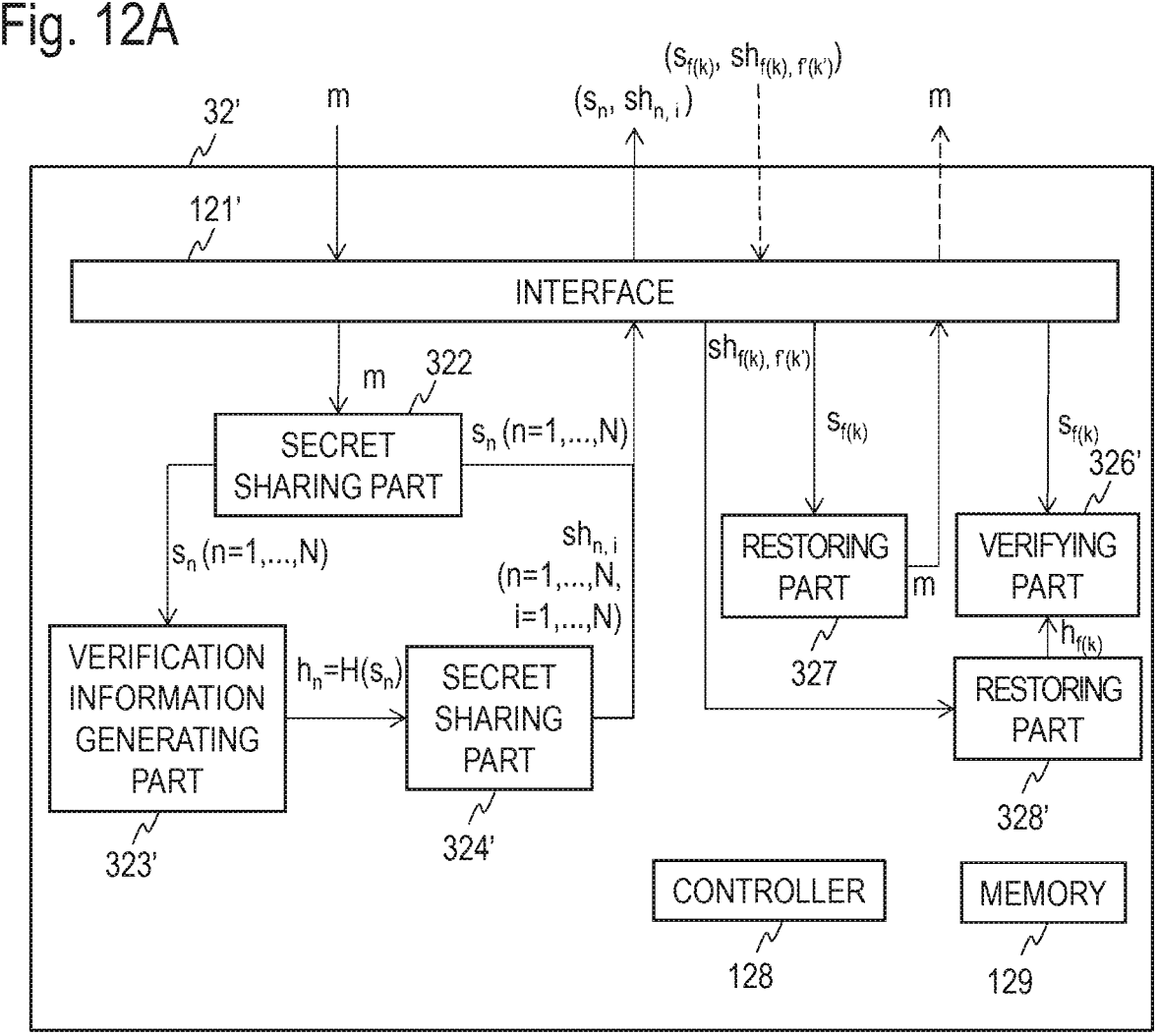
FIG. 12A is a block diagram illustrating a configuration of a security apparatus in a modified example of the third embodiment.
Figure 12B:
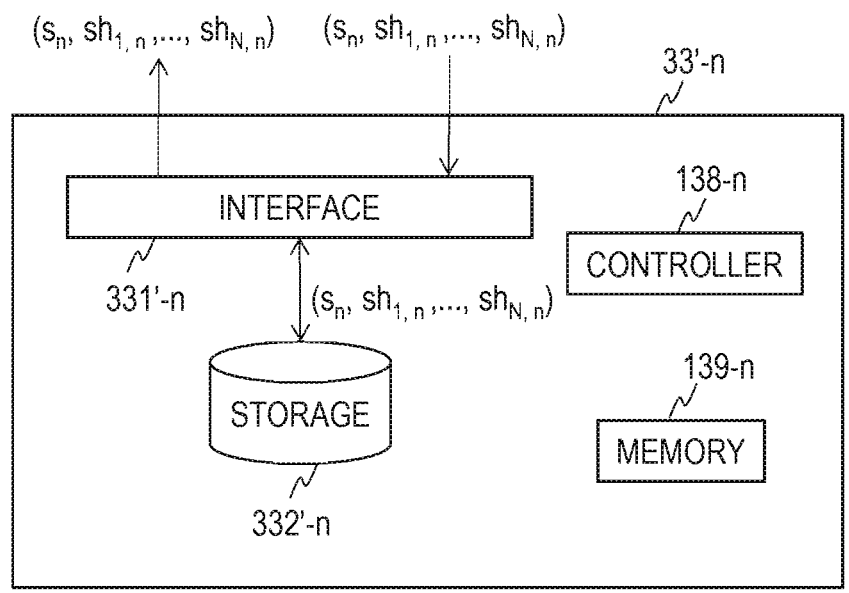
FIG. 12B is a block diagram illustrating a configuration of a storage apparatus in the modified example of the third embodiment.
Figure 13:
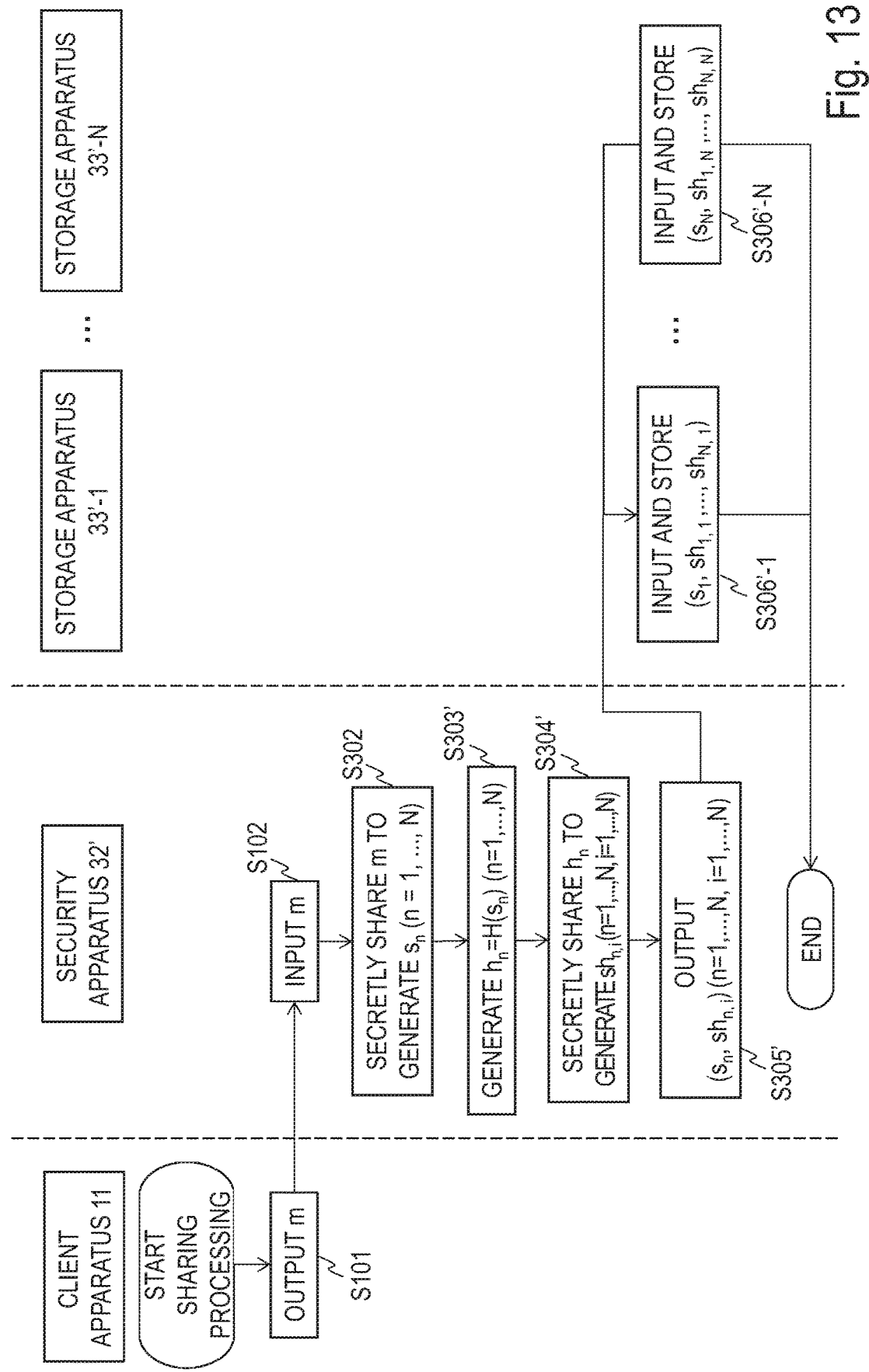
FIG. 13 is a flowchart for illustrating sharing processing in the modified example of the third embodiment.
Figure 14:
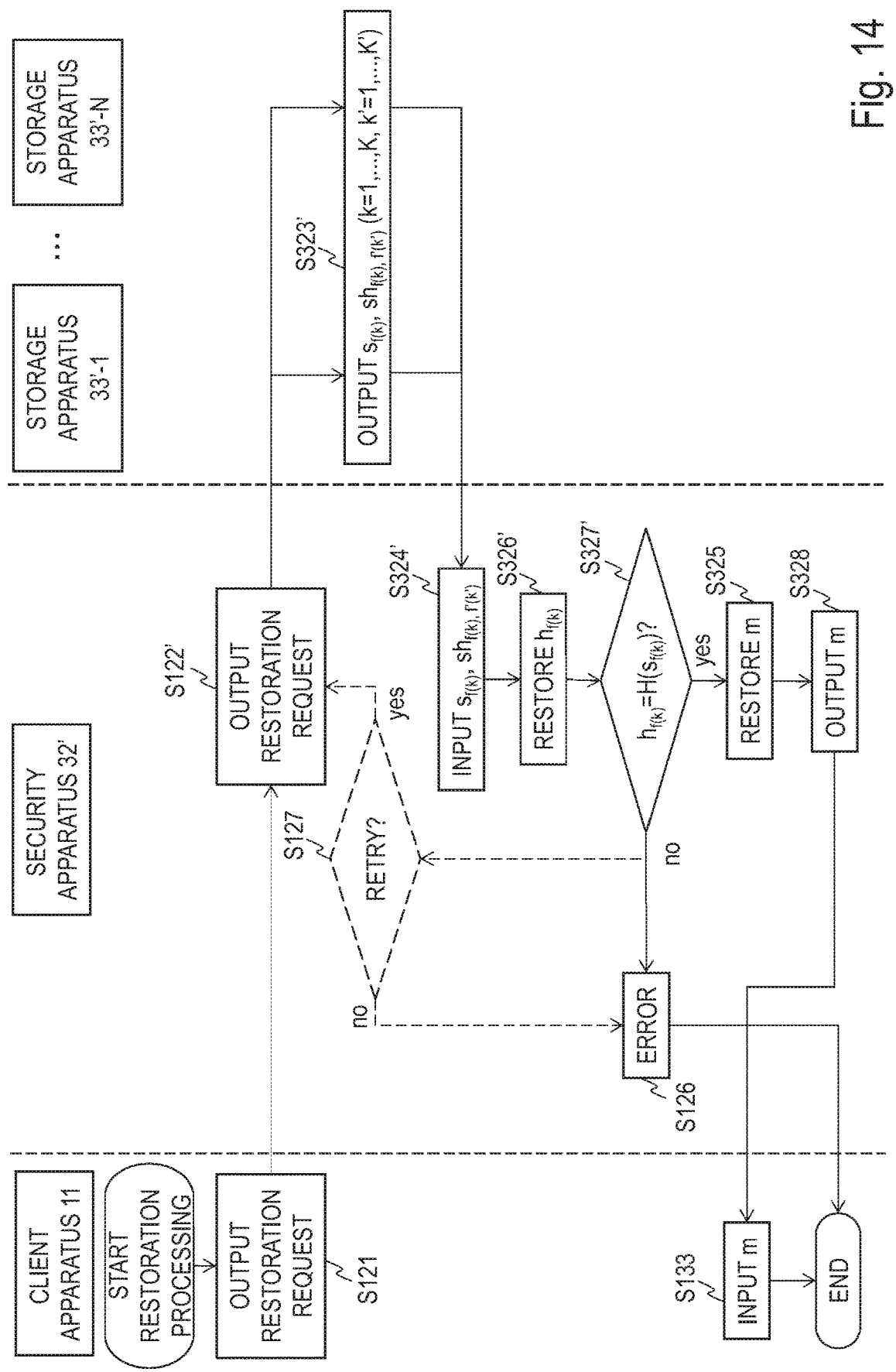
FIG. 14 is a flowchart for illustrating restoration processing in the modified example of the third embodiment.

Further, in the above description, the image H(m) of the processing information m through mapping H is set as the verification information $h_n$. However, instead of this, an image H($s_n$) of fragment information $s_n$ through mapping H, the fragment information $s_n$ is obtained by secretly sharing the processing information m, may be set as the verification information $h_n$. As illustrated in FIG. 13, in secret sharing processing of this modified example, after the above-described processing of step S101 and S102, the secret sharing part 322 of the security apparatus 32' (FIG. 12A) applies secret sharing to the processing information m to obtain and output N (a plurality of) pieces of fragment information $s_n$ (where n=1, ..., N) (step S302), the verification information generating part 323' obtains and outputs verification information $h_n$=H($s_n$) (where n=1, ..., N), the verification information $h_n$ being an image of the fragment information $s_n$ through mapping H (step S303'), the secret sharing part 324' applies secret sharing to each piece of verification information $h_n$ to obtain and output respective N (a plurality of) pieces of second fragment information $sh_{n,\ i}$ (where n=1, ..., N, i=1, ..., N) (step S304'), and the interface 121' outputs the fragment information $s_n$ and the second fragment information $sh_{n,\ i}$ (step S305'). Each piece of fragment information $s_n$ is inputted to the interface 331'-n of each storage apparatus 33'-n (FIG. 12B), and respectively stored in the storage 332'-n (step S306'-n). Further, an aggregate of the second fragment information $\{sh_{1,\ i}, \ldots, sh_{N,\ i}\}$ is inputted to the interface 331'-i of each storage apparatus 33'-i, and respectively stored in the storage 332'-i (step S306'-i). As illustrated in FIG. 14, in restoration processing of this modified example, first, the interface 121' of the security apparatus 32' (FIG. 12A) receives a restoration request transmitted through the above-described processing in step S121. The interface 121' transmits restoration requests to K or more storage apparatuses 33'-η comprised in N storage apparatuses 33-1 to 33'-N. K is an integer equal to or greater than one and equal to or less than N (step S122'). The storage apparatus to which the restoration request is transmitted transmits an aggregate of the fragment information $s_\eta$ and the second fragment information $\{sh_{1,\ \eta}, sh_{N,\ \eta}\}$ from the storage 332'-η. By this means, respective K pieces of fragment information $s_{f(k)}$ (where k=1, ..., K and K' pieces of second fragment information $sh_{f(k),\ f'(k')}$ (where k'=1, ..., K', K' is an integer equal to or greater than one and equal to or less than N) for each f(k) are transmitted to the security apparatus 32'. For example, when K≥K', it is set that K=κ, and when K<K', it is set that K'=κ, κ storage apparatuses 33'-η (where η=g'(1), ..., g'(κ)) transmit the aggregate of the fragment information $s_\eta$ and the second fragment information $\{sh_{1,\ \eta}, \ldots, sh_{N,\ \eta}\}$ to the security apparatus 32'. Here, f' and g' are injection and satisfy $\{f'(1), \ldots, f'(K)\} \subseteq \{1, \ldots, N\}$ and $\{g'(1), \ldots, g'(\kappa)\} \subseteq \{1, \ldots, N\}$ (step S323'). At least K pieces of fragment information $s_{f(k)}$ (where k=1, ..., K) and respective K' pieces of second fragment information $sh_{f(k),\ f'(k')}$ (where k'=1, ..., K') for each f(k) are inputted to the interface 121' of the security apparatus 32' (step S324'). The restoring part 328' of the security apparatus 32' restores and outputs verification information $h_{f(k)}$ from the inputted K' pieces of second fragment information $sh_{f(k),\ f'(k')}$ (where k'=1, ..., K') (step S326'). The verifying part 326' compares second verification information which is an image H($s_{f(k)}$) of the inputted fragment information $s_{f(k)}$ through mapping H with verification information $h_{f(k)}$ restored from the inputted K' pieces of second fragment information $sh_{f(k),\ f'(k')}$ (where k'=1, ..., K') (step S327'). Here, if $h_{f(k)}$=H($s_{f(k)}$) for all of k=1, ..., K, the restoring part 327 of the security apparatus 32' restores and outputs the processing information m from the inputted K pieces of fragment information $s_{f(k)}$ (step S325), and the interface 121' transmits the processing information m to the client apparatus 11 (step S328). On the other hand, if $h_{f(k)}$≠H($s_{f(k)}$) for any of k=1, ..., K the interface 121' of the security apparatus 32' outputs an error (step S126). Alternatively, if it is determined that $h_{f(k)}$≠H($s_{f(k)}$) for any of k=1, ..., K, the controller 128 may determine whether or not retry is possible (step S127), and, if retry is possible, the processing may return to step S122', and if retry is not possible, the interface 121' may output an error (step S126).

Other Modified Example, or the Like

It should be noted that the present invention is not limited to the above-described embodiments. For example, the above-described processing may be executed using information obtained by further dividing information obtained through secret sharing as "fragment information". Restoration in this case is performed by coupling a plurality of pieces of fragment information. Further, in the above-described embodiments, while the security apparatus selects storage apparatus used for restoration upon restoration processing or backup restoration processing, the client apparatus may select storage apparatus used for restoration. Further, in the above-described embodiments, the processing information m is inputted from the client apparatus to the security apparatus upon sharing, and the processing information in is outputted from the security apparatus to the client apparatus after restoration. However, the processing information m may be stored in the storage of the security apparatus in advance prior to sharing, and the processing information m may be stored in the storage of the security apparatus after restoration. In addition, the above-described various processing is not only executed in chronological order according to the description but may be executed individually in parallel according to processing performance of an apparatus which executes processing as necessary. Further, it goes without saying that the above-described embodiments can be modified as appropriate without departing from the scope of the present invention.

Part or all of the processing functions of the above-described apparatuses may be configured using a circuitry which implements the processing functions without using a program, or may be configured by installing a program at a computer. The computer may comprise one processor or comprise a plurality of processors. A processor of such a computer is a hardware processor, and, for example, a circuitry such as a CPU which realizes a functional configuration by a program being loaded. It should be noted that the term "circuitry" not only means a circuitry which implements the processing functions without using a program, but also means a circuitry which realizes the functional configuration by a program being loaded. That is, the above-described apparatuses are, for example, apparatuses comprising a circuitry configured to implement processing of the above-described parts. When the above-described configuration is realized with a computer, processing content of functions of the respective apparatuses is described with a program. By this program being executed at the computer, the above-described processing function is implemented on the computer. The program which describes the processing content can be recorded in a computer readable recording medium. Examples of the computer readable recording medium comprise a non-transitory recording medium. Examples of such a recording medium comprise a magnetic recording apparatus, an optical disc, a magnetooptical recording medium and a semiconductor memory.

This program is distributed by, for example, selling, providing, lending, or the like, a portable recording medium such as a DVD and a CD-ROM in which the program is recorded. Further, it is also possible to employ a configuration where this program is stored in the storage apparatus of the server computer, and the program is distributed by transferring the program from the server computer to another computer via a network.

A computer which executes such a program, for example, first, once stores a program recorded in a portable recording medium or a program transferred from a server computer in a storage apparatus of the computer. Upon execution of processing, the computer reads out the program stored in the storage apparatus of the computer and executes processing according to the read out program. As another implementation form, the computer may directly read out the program from the portable recording medium and execute processing according to the program, or every time the program is transferred from the server computer to the computer, the computer may execute processing according to the received program. It is also possible to employ a configuration where, the above-described processing is executed by so-called ASP (Application Service Provided) type service in which the processing functions are implemented only with an execution instruction of the program and acquisition of a result instead of the program being transferred from the server computer to the computer.

It is also possible to implement at least part of these processing functions with hardware instead of causing a predetermined program to be executed on a computer to implement the processing functions of the apparatus.

DESCRIPTION OF REFERENCE NUMERALS 1-3 Secret sharing system
11 Client apparatus
12, 22, 32, 32' Security apparatus
13-$n$, 23-$n$, 33-$n$, 33'$n$ Storage apparatus

What is claimed is:
1. A security apparatus comprising:
a communication interface configured to receive processing information from a client apparatus over a secure network and to communicate with a plurality of storage apparatuses;
processing circuitry configured to implement
a secret sharing part configured to apply secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K,
a verification information generating part configured to generate verification information $h_n$ which is an image of a respective piece of the fragment information $s_n$ through mapping; and
a memory configured to store the verification information $h_n$,
wherein
the communication interface is configured to output the fragment information $s_1, \ldots, s_N$ each to respective ones of the plurality of storage apparatuses over an unsecure network, and receive the pieces of fragment information among $s_1, \ldots, s_N$ from the respective separate storage apparatuses, along with verification information $h_n'$ which is an image of a respective piece of the fragment information $s_n$ generated at each of the respective separate storage apparatuses, after receiving a request from the client apparatus to restore the processing information,
wherein the processing circuitry is configured to restore the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and the received verification information $h_n'$ matches the verification information $h_n$.

2. The security apparatus according to claim 1, the processing circuitry being further configured to implement:
   a second verification information generating part configured to obtain second verification information g which is an image of the verification information $h_n$ through mapping;
   a second secret sharing part configured to apply secret sharing to information comprising the verification information $h_n$ to obtain a plurality of pieces of second fragment information $sh_n$, and configured to apply secret sharing to information comprising the second verification information g to obtain a plurality of pieces of second fragment information $sg_n$; and
   a second output part configured to output the second fragment information $sh_1, \ldots, sh_N$ and $sg_1, \ldots, sg_N$,
   wherein the verification information $h_n$ can be restored only when the number of obtained pieces of the second fragment information $sh_n$ is equal to or larger than a threshold K and information regarding the verification information $h_n$ is not obtained at all when K or more pieces of the second fragment information $sh_n$ are not obtained; and
   the second verification information g can be restored only when the number of obtained pieces of the second fragment information $sg_n$ is equal to or larger than a threshold K and information regarding the second verification information g is not obtained at all when K or more pieces of the second fragment information $sg_n$ are not obtained.

3. The security apparatus according to claim 1, the processing circuitry being further configured to implement:
   a second verification information generating part configured to obtain second verification information g which is an image of the verification information $h_n$ through mapping;
   a second secret sharing part configured to apply secret sharing to coupled information comprising the verification information g and the second verification information $h_n$ to obtain a plurality of pieces of second fragment information $sh_n$; and
   a second output part configured to output the second fragment information $sh_1, \ldots, sh_N$,
   wherein the verification information $h_n$ and the second verification information g can be restored only when the number of obtained pieces of the second fragment information $sh_n$ is equal to or larger than a threshold K and information regarding the verification information $h_n$ and the second verification information g is not obtained at all when K or more pieces of the second fragment information $sh_n$ are not obtained.

4. A security apparatus comprising:
   a communication interface configured to receive processing information from a client apparatus over a secure network and to communicate with a plurality of storage apparatuses;
   processing circuitry configured to implement
      a secret sharing part configured to apply secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where $N \geq 2$, $K \geq 2$, and $N \geq K$;
   a verification information generating part configured to generate verification information $h_n$ which is an image of a respective piece of the fragment information $s_n$ through mapping;
   a memory configured to store the verification information $h_n$;
   an input part configured to accept input of second fragment information $sh_n$ and $sg_n$ obtained through secret sharing among $sh_1, \ldots, sh_N$ and $sg_1, \ldots, sg_N$;
   a restoring part configured to restore restoration information from the second fragment information $sh_n$ and $sg_n$ inputted to the input part; and
   a verifying part configured to compare second verification information g with third verification information which is an image of the verification information $h_n$ through mapping,
   wherein the restoration information comprises the verification information $h_n$ and the second verification information g,
   the verification information $h_n$ can be restored only when the number of obtained pieces of the second fragment information $sh_n$ is equal to or larger than a threshold K and information regarding the verification information $h_n$ is not obtained at all when K or more pieces of the second fragment information $sh_n$ are not obtained, where $N \geq 2$, $K \geq 2$, and $N \geq K$,
   the second verification information g can be restored only when the number of obtained pieces of the second fragment information $sg_n$ is equal to or larger than a threshold K and information regarding the second verification information g is not obtained at all when K or more pieces of the second fragment information $sg_n$ are not obtained,
   the communication interface is configured to output the fragment information $s_1, \ldots, s_N$ each to respective ones of the plurality of storage apparatuses over an unsecure network, and receive the pieces of fragment information among $s_1, \ldots, s_N$ from the respective separate storage apparatuses, along with verification information $h_n'$ which is an image of a respective piece of the fragment information $s_n$ generated at each of the respective separate storage apparatuses, after receiving a request from the client apparatus to restore the processing information,
   wherein the processing circuitry is configured to restore the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and the received verification information $h_n'$ matches the verification information $h_n$.

5. A security apparatus comprising
   a communication interface configured to receive processing information from a client apparatus over a secure network and to communicate with a plurality of storage apparatuses;
   processing circuitry configured to implement
      a secret sharing part configured to apply secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K;

a verification information generating part configured to generate verification information $h_n$ which is an image of a respective piece of the fragment information $s_n$ through mapping;

a memory configured to store the verification information $h_n$;

an input part configured to accept input of second fragment information $sh_n$ obtained through secret sharing among $sh_1, \ldots, sh_N$;

a restoring part configured to restore restoration information from the second fragment information $sh_n$ inputted to the input part; and a verifying part configured to compare second verification information g with third verification information which is an image of the verification information $h_n$ through mapping, wherein the restoration information comprises the verification information $h_n$ and the second verification information g, the verification information $h_n$ and the second verification g information can be restored only when the number of obtained pieces of the second fragment information $sh_n$ is equal to or larger than a threshold K and information regarding the verification information $h_n$ and the second verification g information is not obtained at all when K or more pieces of the second fragment information $sh_n$ are not obtained, where N≥2, K≥2, and N≥K, the communication interface is configured to output the fragment information $s_1, \ldots, s_N$ each to respective ones of the plurality of storage apparatuses over an unsecure network, and receive the pieces of fragment information among $s_1, \ldots, s_N$ from the respective separate storage apparatuses, along with verification information $h_n{'}$ which is an image of a respective piece of the fragment information $s_n$ generated at each of the respective separate storage apparatuses, after receiving a request from the client apparatus to restore the processing information, wherein the processing circuitry is configured to restore the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and the received verification information $h_n{'}$ matches the verification information $h_n$.

6. A security apparatus comprising:

a communication interface configured to receive processing information from a client apparatus over a secure network and to communicate with a plurality of storage apparatuses;

processing circuitry configured to implement a first secret sharing part configured to apply secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K;

a verification information generating part configured to generate verification information $h_n$ which is an image of a respective piece of the fragment information $s_n$ through mapping;

a memory configured to store the verification information $h_n$; and a second secret sharing part configured to apply secret sharing to the verification information $h_n$ to obtain a plurality of pieces of second fragment information, wherein the communication interface is configured to output the fragment information $s_1, \ldots, s_N$ and the second fragment information to each to respective ones of the plurality of storage apparatuses over an unsecure network, and receive the pieces of fragment information among $s_1, \ldots, s_N$ and the second fragment information from the respective separate storage apparatuses, after receiving a request from the client apparatus to restore the processing information, wherein the processing circuitry is configured to restore the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and verification information $h_n{'}$ which is an image of a respective piece of the fragment information $s_n$ matches verification information $h_n$ which is restored from the second fragment information.

7. The security apparatus according to any of claims 1 to 5 and 6, wherein the mapping has one-wayness or collision resistance.

8. A method implemented by a security apparatus that includes processing circuitry and a communication interface configured to receive processing information from a client apparatus over a secure network and to communicate with a plurality of storage apparatuses, the method comprising:

applying secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K;

generating verification information $h_n$ which is an image of a respective piece of the fragment information $s_n$ through mapping;

storing, in a memory, the verification information $h_n$, outputting, via the communication interface, the fragment information $s_1, \ldots, s_N$ each to respective ones of the plurality of storage apparatuses over an unsecure network, and receiving the pieces of fragment information among $s_1, \ldots, s_N$ from the respective separate storage apparatuses, along with verification information $h_n{'}$ which is an image of a respective piece of the fragment information $s_n$ generated at each of the respective separate storage apparatuses, after receiving a request from the client apparatus to restore the processing information;

restoring the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and the received verification information $h_n'$ matches the verification information $h_n$.

9. A method implemented by a security apparatus that includes processing circuitry and a communication interface configured to receive processing information from a client apparatus over a secure network and to communicate with a plurality of storage apparatuses, the method comprising:

applying secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K, and generating verification information $h_n$ which is an image of a respective piece of the fragment information $s_n$ through mapping;

storing, in a memory, the verification information $h_n$;

accepting input of second fragment information $sh_n$ and $sg_n$ obtained through secret sharing among $sh_1, \ldots, sh_N$ and $sg_1, \ldots, sg_N$;

restoring restoration information from the second fragment information $sh_n$ and $sg_n$ inputted to the input part;

comparing second verification information g with third verification information which is an image of the verification information $h_n$ through mapping, wherein the restoration information comprises the verification information $h_n$ and the second verification information g, the verification information $h_n$ can be restored only when the number of obtained pieces of the second fragment information $sh_n$ is equal to or larger than a threshold K and information regarding the verification information $h_n$ is not obtained at all when K or more pieces of the second fragment information $sh_n$ are not obtained, where N≥2, K≥2, and N≥K, the second verification information g can be restored only when the number of obtained pieces of the second fragment information $sg_n$ is equal to or larger than a threshold K and information regarding the second verification information g is not obtained at all when K or more pieces of the second fragment information $sg_n$ are not obtained, wherein the method further includes outputting, via the communication interface, the fragment information $s_1, \ldots, s_N$ each to respective ones of the plurality of storage apparatuses over an unsecure network, and receiving the pieces of fragment information among $s_1, \ldots, s_N$ from the respective separate storage apparatuses, along with verification information $h_n'$ which is an image of a respective piece of the fragment information $s_n$ generated at each of the respective separate storage apparatuses, after receiving a request from the client apparatus to restore the processing information, and restoring the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and the received verification information $h_n'$ matches the verification information $h_n$.

10. A method implemented by a security apparatus that includes processing circuitry and a communication interface configured to receive processing information from a client apparatus over a secure network and to communicate with a plurality of storage apparatuses, the method comprising:

applying secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K, and generating verification information $h_n$ which is an image of a respective piece of the fragment information $s_n$ through mapping;

storing, in a memory, the verification information $h_n$;

accepting input of second fragment information $sh_n$ obtained through secret sharing among $sh_1, \ldots, sh_N$;

restoring restoration information from the second fragment information $sh_n$ inputted to the input part; and comparing second verification information g with third verification information which is an image of the verification information $h_n$ through mapping, wherein the restoration information comprises the verification information $h_n$ and the second verification information g, the verification information $h_n$ and the second verification g information can be restored only when the number of obtained pieces of the second fragment information $sh_n$ is equal to or larger than a threshold K and information regarding the verification information $h_n$ and the second verification g information is not obtained at all when K or more pieces of the second fragment information $sh_n$ are not obtained, where N≥2, K≥2, and N≥K, the method further including outputting, via the communication interface, the fragment information $s_1, \ldots, s_N$ each to respective ones of the plurality of storage apparatuses over an unsecure network, and receive the pieces of fragment information among $s_1, \ldots, s_N$ from the respective separate storage apparatuses, along with verification information $h_n'$ which is an image of a respective piece of the fragment information $s_n$ generated at each of the respective separate storage apparatuses, after receiving a request from the client apparatus to restore the processing information, and restoring the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and the received verification information $h_n'$ matches the verification information $h_n$.

11. A method implemented by a security apparatus that includes processing circuitry and a communication interface configured to receive processing information from a client apparatus over a secure network and to communicate with a plurality of storage apparatuses, the method comprising:
   applying secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K, and
   generating verification information $h_n$ which is an image of a respective piece of the fragment information $s_n$ through mapping;
   storing, in a memory, the verification information $h_n$;
   applying secret sharing to the verification information $h_n$ to obtain a plurality of pieces of second fragment information,
   outputting the fragment information $s_1, \ldots, s_N$ and the second fragment information to each to respective ones of the plurality of storage apparatuses over an unsecure network, and receiving the pieces of fragment information among $s_1, \ldots, s_N$ and the second fragment information from the respective separate storage apparatuses, after receiving a request from the client apparatus to restore the processing information, and
   restoring the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and verification information $h_n'$ which is an image of a respective piece of the fragment information $s_n$ matches verification information $h_n$ which is restored from the second fragment information.

12. A non-transitory computer-readable recording medium having stored thereon a program for causing a computer to function as a security apparatus comprising a communication interface configured to receive processing information from a client apparatus over a secure network and to communicate with a plurality of storage apparatuses and processing circuitry configured to implement:
   a secret sharing part configured to apply secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K;
   a verification information generating part configured to generate verification information $h_n$ which is an image of a respective piece of the fragment information $s_n$ through mapping; and
   a memory configured to store the verification information $h_n$,
   wherein
   the communication interface is configured to output the fragment information $s_1, \ldots, s_N$ each to respective ones of the plurality of storage apparatuses over an unsecure network, and receive the pieces of fragment information among $s_1, \ldots, s_N$ from the respective separate storage apparatuses, along with verification information $h_n'$ which is an image of a respective piece of the fragment information $s_n$ generated at each of the respective separate storage apparatuses, after receiving a request from the client apparatus to restore the processing information,
   wherein the processing circuitry is configured to restore the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and the received verification information $h_n'$ matches the verification information $h_n$.

13. A non-transitory computer-readable recording medium having stored thereon a program for causing a computer to function as a security apparatus comprising a communication interface configured to receive processing information from a client apparatus over a secure network and to communicate with a plurality of storage apparatuses and processing circuitry configured to implement:
   a secret sharing part configured to apply secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K;
   a verification information generating part configured to generate verification information $h_n$ which is an image of a respective piece of the fragment information $s_n$ through mapping;
   a memory configured to store the verification information $h_n$;
   an input part configured to accept input of second fragment information $sh_n$ and $sg_n$ obtained through secret sharing among $sh_1, \ldots, sh_N$ and $sg_1, \ldots, sg_N$;
   a restoring part configured to restore restoration information from the second fragment information $sh_n$ and $sg_n$ inputted to the input part; and
   a verifying part configured to compare second verification information g with third verification information which is an image of the verification information $h_n$ through mapping,
   wherein the restoration information comprises the verification information $h_n$ and the second verification information g,
   the verification information $h_n$ can be restored only when the number of obtained pieces of the second fragment information $sh_n$ is equal to or larger than a threshold K and information regarding the verification information $h_n$ is not obtained at all when K or more pieces of the second fragment information $sh_n$ are not obtained, where N≥2, K≥2, and N≥K,
   the second verification information g can be restored only when the number of obtained pieces of the second fragment information $sg_n$ is equal to or larger than a threshold K and information regarding the second verification information g is not obtained at all when K or more pieces of the second fragment information $sg_n$ are not obtained, the communication interface is configured to output the fragment information $s_1, \ldots, s_N$ each to respective ones of the plurality of storage apparatuses over an unsecure network, and receive the pieces of fragment information among $s_1, \ldots, s_N$ from the respective separate storage apparatuses, along with verification information $h_n'$ which is an image of a respective piece of the fragment information $s_n$ generated at the respective separate storage apparatuses, after receiving a request from the client apparatus to restore the processing information, wherein the processing circuitry is configured to restore the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and the received verification information $h_n'$ matches the verification information $h_n$.

14. A non-transitory computer-readable recording medium having stored thereon a program for causing a computer to function as a security apparatus comprising a communication interface configured to receive processing information from a client apparatus over a secure network and to communicate with a plurality of storage apparatuses and processing circuitry configured to implement:

a secret sharing part configured to apply secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K;

a verification information generating part configured to generate verification information $h_n$ which is an image of a respective piece of the fragment information $s_n$ through mapping;

a memory configured to store the verification information $h_n$;

an input part configured to accept input of second fragment information $sh_n$ obtained through secret sharing among $sh_1, \ldots, sh_N$;

a restoring part configured to restore restoration information from the second fragment information $sh_n$ inputted to the input part; and a verifying part configured to compare second verification information g with third verification information which is an image of the verification information $h_n$ through mapping, wherein the restoration information comprises the verification information $h_n$ and the second verification information g, the verification information $h_n$ and the second verification g information can be restored only when the number of obtained pieces of the second fragment information $sh_n$ is equal to or larger than a threshold K and information regarding the verification information $h_n$ and the second verification g information is not obtained at all when K or more pieces of the second fragment information $sh_n$ are not obtained, where N≥2, K≥2, and N≥K, the communication interface is configured to output the fragment information $s_1, \ldots, s_N$ each to respective ones of the plurality of storage apparatuses over an unsecure network, and receive the pieces of fragment information among $s_1, \ldots, s_N$ from the respective separate storage apparatuses, along with verification information $h_n'$ which is an image of a respective piece of the fragment information $s_n$ generated at each of the respective separate storage apparatuses, after receiving a request from the client apparatus to restore the processing information, wherein the processing circuitry is configured to restore the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and the received verification information $h_n'$ matches the verification information $h_n$.

15. A non-transitory computer-readable recording medium having stored thereon a program for causing a computer to function as a security apparatus comprising a communication interface configured to receive processing information from a client apparatus over a secure network and to communicate with a plurality of storage apparatuses and processing circuitry configured to implement:

a first secret sharing part configured to apply secret sharing to the processing information to obtain N pieces of fragment information $s_1, \ldots, s_N$ so that the processing information can be restored only when the number of obtained pieces of the fragment information from among $s_1, \ldots, s_N$ is equal to or larger than a threshold K and information regarding the processing information is not obtained at all when K or more pieces of the fragment information from among $s_1, \ldots, s_N$ are not obtained, where N≥2, K≥2, and N≥K;

a verification information generating part configured to generate verification information $h_n$ which is an image of a respective piece of the fragment information $s_n$ through mapping;

a memory configured to store the verification information $h_n$; and a second secret sharing part configured to apply secret sharing to the verification information $h_n$ to obtain a plurality of pieces of second fragment information, wherein the communication interface is configured to output the fragment information $s_1, \ldots, s_N$ and the second fragment information to each to respective ones of the plurality of storage apparatuses over an unsecure network, and receive the pieces of fragment information among $s_1, \ldots, s_N$ and the second fragment information from the respective separate storage apparatuses, after receiving a request from the client apparatus to restore the processing information, wherein the processing circuitry is configured to restore the processing information from the pieces of fragment information among $s_1, \ldots, s_N$ received from the respective separate storage apparatuses when the pieces of the fragment information among $s_1, \ldots, s_N$ received from the respective separate storage apparatuses is equal to or larger than the threshold K and verification information $h_n'$ which is an image of a respective piece of the fragment information $s_n$ matches verification information $h_n$ which is restored from the second fragment information.

* * * * *